(12) United States Patent
Hatton et al.

(10) Patent No.: US 11,602,716 B2
(45) Date of Patent: Mar. 14, 2023

(54) TREATMENT OF ACID GASES USING MOLTEN ALKALI METAL BORATES, AND ASSOCIATED METHODS OF SEPARATION

(71) Applicant: Massachusetts Institute of Technology, Cambridge, MA (US)

(72) Inventors: Trevor Alan Hatton, Sudbury, MA (US); Takuya Harada, Nagoya (JP); Cameron G. Halliday, Wokingham (GB)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/681,413

(22) Filed: Feb. 25, 2022

(65) Prior Publication Data
US 2022/0258098 A1 Aug. 18, 2022

Related U.S. Application Data

(63) Continuation of application No. 17/090,180, filed on Nov. 5, 2020, now Pat. No. 11,291,950.
(Continued)

(51) Int. Cl.
| | |
|---|---|
| *C01B 35/12* | (2006.01) |
| *B01D 53/50* | (2006.01) |
| *B01D 53/52* | (2006.01) |
| *B01D 53/56* | (2006.01) |
| *B01D 53/80* | (2006.01) |

(52) U.S. Cl.
CPC .......... *B01D 53/80* (2013.01); *B01D 53/502* (2013.01); *B01D 53/523* (2013.01); *B01D 53/56* (2013.01); *C01B 35/128* (2013.01); *B01D 2251/302* (2013.01); *B01D 2251/304* (2013.01); *B01D 2251/60* (2013.01); *B01D 2257/302* (2013.01); *B01D 2257/304* (2013.01); *B01D 2257/402* (2013.01); *B01D 2257/404* (2013.01)

(58) Field of Classification Search
CPC .... C01B 35/128; B01D 53/80; B01D 53/502; B01D 53/56; B01D 53/523; B01D 2257/304; B01D 2251/304; B01D 2251/60; B01D 2257/402; B01D 2257/404; B01D 2257/302; B01D 2251/302; B01J 10/005
See application file for complete search history.

(56) References Cited

U.S. PATENT DOCUMENTS

| | | |
|---|---|---|
| 1,783,901 A | 12/1930 | Bottoms |
| 3,438,728 A | 4/1969 | Grantham |

(Continued)

FOREIGN PATENT DOCUMENTS

| | | |
|---|---|---|
| CN | 102448581 A | 5/2012 |
| CN | 102895847 A | 1/2013 |

(Continued)

OTHER PUBLICATIONS

U.S. Appl. No. 17/090,146, filed Nov. 5, 2020, Hatton et al.
(Continued)

*Primary Examiner* — Timothy C Vanoy
(74) *Attorney, Agent, or Firm* — Wolf, Greenfield & Sacks, P.C.

(57) ABSTRACT

The removal of acid gases (e.g., non-carbon dioxide acid gases) using sorbents that include salts in molten form, and related systems and methods, are generally described.

23 Claims, 12 Drawing Sheets

Related U.S. Application Data

(60) Provisional application No. 62/971,488, filed on Feb. 7, 2020, provisional application No. 62/932,410, filed on Nov. 7, 2019.

(56) References Cited

U.S. PATENT DOCUMENTS

| | | | |
|---|---|---|---|
| 3,754,074 A * | 8/1973 | Grantham | B01D 53/925 423/240 R |
| 3,932,582 A | 1/1976 | Eickmeyer | |
| 4,086,323 A | 4/1978 | Moore et al. | |
| 4,208,387 A | 6/1980 | Klass et al. | |
| 4,448,899 A | 5/1984 | Hass | |
| 4,470,958 A | 9/1984 | van Gelder et al. | |
| 4,973,456 A | 11/1990 | Quinn et al. | |
| 5,338,521 A | 8/1994 | Quinn et al. | |
| 5,455,015 A | 10/1995 | Zhadanovsky | |
| 7,674,947 B2 | 3/2010 | Barends | |
| 10,322,399 B2 | 6/2019 | Harada et al. | |
| 10,464,015 B2 | 11/2019 | Worsley et al. | |
| 10,625,204 B2 | 4/2020 | Lubomirksy et al. | |
| 10,913,658 B2 | 2/2021 | Harada et al. | |
| 11,291,950 B2 | 4/2022 | Hatton et al. | |
| 11,311,840 B2 | 4/2022 | Hatton et al. | |
| 2011/0035154 A1 | 2/2011 | Kendall et al. | |
| 2011/0089377 A1* | 4/2011 | Bingham | B01J 10/005 422/198 |
| 2012/0128559 A1 | 5/2012 | Olsen | |
| 2016/0059179 A1 | 3/2016 | Billings | |
| 2017/0128856 A1 | 5/2017 | Anguille et al. | |
| 2017/0165633 A1 | 6/2017 | Harada et al. | |
| 2017/0361266 A1 | 12/2017 | Find et al. | |
| 2018/0243688 A1 | 8/2018 | Hamrin | |
| 2018/0354807 A1 | 12/2018 | Harada et al. | |
| 2021/0138401 A1 | 5/2021 | Hatton et al. | |
| 2021/0138438 A1 | 5/2021 | Hatton et al. | |
| 2021/0387141 A1 | 12/2021 | Hatton et al. | |

FOREIGN PATENT DOCUMENTS

| | | |
|---|---|---|
| CN | 107029538 A | 8/2017 |
| DE | 100 35 188 A1 | 2/2002 |
| EP | 0 414 292 A1 | 2/1991 |
| JP | H04-367723 A | 12/1992 |
| JP | H11-183050 A | 7/1999 |
| WO | WO 2010/137995 A1 | 12/2010 |
| WO | WO 2012/176208 A1 | 12/2012 |
| WO | WO 2018/227081 A1 | 12/2018 |
| WO | WO 2020/072115 A1 | 4/2020 |

OTHER PUBLICATIONS

Office Action for U.S. Appl. No. 17/090,146 dated Nov. 26, 2021.
Invitation to Pay Additional Fees for International Patent Application No. PCT/US2020/059167, dated Feb. 25, 2021.
International Search Report and Written Opinion for International Patent Application No. PCT/US2020/059167, dated Apr. 16, 2021.
[No Author Listed], Alternative Control Techniques Document—NOx Emissions from Iron and Steel Mills. United States Environmental Protection Agency. Sep. 1994:170 pages.
[No Author Listed], Effective date of implementation of the fuel oil standard in regulation 14.1.3 of MARPOL Annex VI, Resolution MEPC.280(70). International Maritime Organization. London, United Kingdom. Adopted Oct. 28, 2016. 1 page.
[No Author Listed], Initial IMO Strategy on Reduction of GHG Emissions from Ships, Resolution MEPC.304(72). International Maritime Organization. London, United Kingdom. Adopted Apr. 13, 2018. 11 pages.
[No Author Listed], Sulphur 2020 implementation—IMO issues additional guidance. International Maritime Organization. London, United Kingdom. May 20, 2019:5 pages. Accessed from <http://www.imo.org/en/MediaCentre/PressBriefings/Pages/10-MEPC-74-sulphur-2020.aspx>.
[No Author Listed], Title IV—Acid Deposition Control. United States Environmental Protection Agency. 2002:68 pages.
Abanades et al., Conversion Limits in the Reaction of CO2 with Lime. Energy and Fuels. 2003;17:308-15. Epub Jan. 28, 2003.
Alcalde et al., Estimating geological CO2 storage security to deliver on climate mitigation. Nature Communications. 2018;9:2201. 13 pages.
Alderman et al., Borate Melt Structure: Temperature-Dependent B—O Bond Lengths and Coordination Numbers from High-Energy X-Ray Diffraction. J. Am. Ceram. Soc. 2018;101:3357-71.
Alderman et al., Temperature-Driven Structural Transitions in Molten Sodium Borates Na2O—B2O3: X-Ray Diffraction, Thermodynamic Modeling, and Implications for Topological Constraint Theory. J. Phys. Chem. C. 2016;120:553-60. Epub Dec. 16, 2015.
Allanore et al., A New Anode Material for Oxygen Evolution in Molten Oxide Electrolysis. Nature. May 16, 2013;497:353-6.
Araten, Some Molten Ionic Oxides as Chemical Reagents. J. Appl. Chem. Apr. 1968;18:118-21.
Argyle et al., Heterogeneous Catalyst Deactivation and Regeneration: A Review. Catalysts. 2015;5:145-269. Epub Feb. 26, 2015.
Avrami, Kinetics of Phase Change. I General Theory. J. Chem. Phys. Journal of Chemical Physics. Dec. 1939;7:1103-12.
Backensto et al., High Temperature Hydrogen Sulfide Corrosion. Corrosion. Jan. 1956;12:22-32.
Barker et al., The Reversibility of the Reaction CaCO3=CaO+CO2. J. Appl. Chem. Biotechnol. 1973;23:733-42.
Basu, Combustion of coal in circulating fluidized-bed boilers: a review. Chemical Engineering Science. 1999;54:5547-57.
Bell et al., An overview of technologies for reduction of oxides of nitrogen from combustion furnaces. MPR Associates. Washington, DC. Accessed Nov. 9, 2021 as available Mar. 22, 2015 from <https://web.archive.org/web/20150322202854/https://www.mpr.com/uploads/news/nox-reduction-coal-fired.pdf>. 23 pages.
Belo et al., High-Temperature Conversion of SO2 to SO3: Homogeneous Experiments and Catalytic Effect of Fly Ash from Air and Oxy-fuel Firing. Energy & Fuels. 2014;28:7243-51. Epub Oct. 23, 2014.
Berstad et al., Post-Combustion CO2 Capture from a Natural Gas Combined Cycle by CaO/CaCO3 Looping. Int. J. Greenh. Gas Control. 2012;11:25-33. Epub Aug. 24, 2012.
Bhatia et al., Effect of the Product Layer on the Kinetics of the CO2-Lime Reaction. AIChE J. Jan. 1983;29(1):79-86.
Blamey et al., The calcium looping cycle for large-scale CO2 capture. Progress in Energy and Combustion Science. 2010;36:260-79. Epub Dec. 29, 2009.
Blomen et al., Capture Technologies: Improvements and Promising Developments. Energy Procedia. 2009;1:1505-12.
Bobkova et al., Low-Melting Glasses Based on Borate Systems. Glas. Ceram. (English Transl. Stekло i Keramika.) 2004;61(5-6):175-7.
Bosoaga et al., CO2 capture technologies for cement industry. Energy Procedia. 2009;1:133-40.
Bui et al., Carbon capture and storage (CCS): the way forward. Energy & Environmental Science. 2018;11:1062-176. Epub Mar. 12, 2018.
Chakravarty et al., Reaction of acid gases with mixtures of amines. Chem. Eng. Prog. Apr. 1985;81(4):32-6.
Chen et al., High-temperature sulfidation behavior of Ni—Nb alloys. Oxidation of Metals. 1989;31(3/4):237-63.
Chen et al., Outdoor air pollution: nitrogen dioxide, sulfur dioxide, and carbon monoxide health effects. The American Journal of the Medical Sciences. Apr. 2007;333(4):249-56.
Choi et al., Adsorbent materials for carbon dioxide capture from large anthropogenic point sources. ChemSusChem. 2009;2(9):796-854. doi: 10.1002/cssc.200900036.
Courson et al., CaO-Based High-Temperature CO2 Sorbents. In Pre-combustion Carbon Dioxide Capture Materials; Wang, Q., Ed.; The Royal Society of Chemistry. London, United Kingdom. 2018:144-237.
Cousin-Saint-Remi et al., Applying the wave theory to fixed-bed dynamics of Metal-Organic Frameworks exhibiting stepped adsorption isotherms: Water/ethanol separation on ZIF-8. Chemical Engineering Journal. 2017;324:313-23. Epub Apr. 28, 2017.

(56) References Cited

OTHER PUBLICATIONS

Cuffe et al., Air Pollutant Emissions from Coal-Fired Power. Journal of the Air Pollution Control Association. 1964;14(9):353-62.
Da Silva et al., Emissions from Postcombustion CO2 Capture Plants. Environmental Science & Technology. 2013;47:659-60. Epub Jan. 3, 2013.
D'Alessandro et al., Carbon Dioxide Capture: Prospects for New Materials. Angewandte Chemie International Edition. Aug. 2010;49:6058-82.
Darunte et al., Moving Beyond Adsorption Capacity in Design of Adsorbents for CO2 Capture from Ultradilute Feeds: Kinetics of CO2 Adsorption in Materials with Stepped Isotherms. Industrial & Engineering Chemistry Research. 2019;58:366-77. Epub Dec. 6, 2018.
Das et al., An Overview of Utilization of Slag and Sludge from Steel Industries. Resour. Conserv. Recycl. 2007;50:40-57. Epub Jul. 7, 2006.
Davidson et al., IPCC Special Report on Carbon Dioxide Capture and Storage. Prepared by Working Group III of the International Panel on Climate Change. [Metz, B., O. Davidson, H. C. de Coninck, M. Loos, and L. A. Meyer (eds.)]. Cambridge University Press, Cambridge, United Kingdom and New York, NY, USA. 2005:443 pages.
De Bruijn et al., Kinetic Parameters in Avrami-Erofeev Type Reactions from Isothermal and Non-Isothermal Experiments. Thermochimica Acta. 1981;45:315-25.
Dessureault et al., Coupled Phase Diagram/Thermodynamic Analysis of the Nine Common-Ion Binary Systems Involving the Carbonates and Sulfates of Lithium, Sodium, and Potassium. Journal of the Electrochemical Society. Sep. 1990;137:2941-50.
Dolan et al., Multicomponent Diffusion in Molten Slags. Metall. Mater. Trans. B. Aug. 2004;35B:675-84.
Dutcher et al., Amine-Based CO2 Capture Technology Development from the Beginning of 2013—A Review. ACS Appl. Mater. Interfaces. 2015;7:2137-48. Epub Jan. 21, 2015.
Edenhofer et al., Climate Change 2014: Mitigation of Climate Change. Contribution of Working Group III to the Fifth Assessment Report of the Intergovernmental Panel on Climate Change. Cambridge University Press, Cambridge, United Kingdom and New York, NY, USA. 2014:1454 pages.
Elkin et al., Molten Oxide Glass Materials for Thermal Energy Storage. Energy Procedia. 2014;49:772-9.
Eow, Recovery of Sulfur from Sour Acid Gas: A Review of the Technology. Environmental Progress. Oct. 2002;21(3):143-62.
Fang et al., Continuous CO2 Capture from Flue Gases Using a Dual Fluidized Bed Reactor with Calcium-Based Sorbent. Ind. Eng. Chem. Res. 2009;48:11140-7. Epub Nov. 18, 2009.
Feng et al., Overcoming the Problem of Loss-in-Capacity of Calcium Oxide in CO2 Capture. Energy and Fuels. 2006;20:2417-20. Epub Oct. 5, 2006.
Fine et al., Absorption of nitrogen oxides in aqueous amines. Energy Procedia. 2014;63:830-47.
Gao et al., MgO-Based Intermediate-Temperature CO2 Adsorbents. In Pre-combustion Carbon Dioxide Capture Materials; Wang, Q., Ed.; The Royal Society of Chemistry. London, United Kingdom. 2018:61-143.
Garg et al., A technology review for regeneration of sulfur rich amine systems. International Journal of Greenhouse Gas Control. 2018;75:243-53.
Gehring et al., Emissions Trading Lessons From SOx and NOx Emissions Allowance and Credit Systems Legal Nature, Title, Transfer, and Taxation of Emission Allowances and Credits. Environmental Law Reporter. 2005:17 pages.
Grasa et al., CO2 Capture Capacity of CaO in Long Series of Carbonation/Calcination Cycles. Ind. Eng. Chem. Res. 2006;45:8846-51. Epub Nov. 9, 2006.
Guidotti, Hydrogen Sulfide: Advances in Understanding Human Toxicity. International Journal of Toxicology. 2010;29(6):569-81. Epub Nov. 12, 2010.
Gupta et al., Carbonation-Calcination Cycle Using High Reactivity Calcium Oxide for Carbon Dioxide Separation from Flue Gas. Industrial & Engineering Chemistry Research. 2002;41:4035-42. Epub Jul. 11, 2002.
Halliday et al., Acid Gas Capture at High Temperatures Using Molten Alkali Metal Borates. Environ Sci Technol. May 19, 2020;54(10):6319-6328. doi: 10.1021/acs.est.0c01671. Epub Apr. 29, 2020.
Halliday et al., Bench-Scale Demonstration of Molten Alkali Metal Borates for High-Temperature CO2 Capture. Ind. Eng. Chem. Res. 2020;59(19):8937-45. Epub Apr. 19, 2020.
Halliday et al., Sorbents for the Capture of CO2 and Other Acid Gases: A Review. Ind. Eng. Chem. Res. 2021 ;60(26):9313-46. Epub Jun. 28, 2021.
Hanak et al., A review of developments in pilot-plant testing and modelling of calcium looping process for CO2 capture from power generation systems. Energy & Environmental Science. 2015;8:2199-249. Epub Jun. 8, 2015.
Hanak et al., Calcium looping combustion for high-efficiency low-emission power generation. Journal of Cleaner Production. 2017;161:245-55. Epub May 19, 2017.
Harada et al., Alkali Metal Nitrate-Promoted High-Capacity MgO Adsorbents for Regenerable CO2 Capture at Moderate Temperatures. Chem Mater. 2015;27:1943-9. Epub Mar. 3, 2015.
Harada et al., Colloidal Nanoclusters of MgO Coated with Alkali Metal Nitrates/Nitrites for Rapid, High Capacity CO2 Capture at Moderate Temperature. Chem Mater. 2015;27:8153-61. Epub Nov. 9, 2015.
Harada et al., Molten ionic oxides for CO2 capture at medium to high temperatures. J. Mater. Chem. A. 2019;7:21827-34. Epub Sep. 5, 2019.
Harada et al., Tri-lithium borate (Li3BO3); a new highly regenerable high capacity CO2 adsorbent at intermediate temperature. J. Mater. Chem A. 2017;5:22224-33. Epub Oct. 7, 2017.
Harrison, Sorption-Enhanced Hydrogen Production: A Review. Ind. Eng. Chem. Res. 2008;47:6486-501. Epub Jul. 31, 2008.
Jansen et al., Pre-Combustion CO2 Capture. Int. J. Greenh. Gas Control. 2015;40:167-87. Epub Jul. 27, 2015.
Janz et al., Molten Salts Data: Diffusion Coefficients in Single and Multi Component Salt Systems. J. Phys. Chem. Ref. Data. 1982;11(3):505-693.
Kato et al., Carbon Dioxide Absorption by Lithium Orthosilicate in a Wide Range of Temperature and Carbon Dioxide Concentrations. J. Mater. Sci. Lett. 2002;21:485-7.
Khawam et al., Solid-State Kinetic Models: Basics and Mathematical Fundamentals. J. Phys. Chem. B. 2006;110:17315-28. Epub Aug. 15, 2006.
Kterzkowska et al., CaO-Based CO2 Sorbents: From Fundamentals to the Development of New, Highly Effective Materials. ChemSusChem. 2013;6:1130-48.
Kim et al., A Solid Sorbent-Based Multi-Stage Fluidized Bed Process with Inter-Stage Heat Integration as an Energy Efficient Carbon Capture Process. Int. J. Greenh. Gas Control. 2014;26:135-46. Epub May 21, 2014.
Ko et al., The sorption of hydrogen sulfide from hot syngas by metal oxides over supports. Chemosphere. 2005;58:467-74. Epub Nov. 10, 2004.
Koningen et al., Sulfur-Deactivated Steam Reforming of Gasified Biomass. Ind. Eng. Chem. Res. 1998;37:341-6. Epub Jan. 16, 1998.
Koytsoumpa et al., The CO2 economy: Review of CO2 capture and reuse technologies. The Journal of Supercritical Fluids. 2018;132:3-16. Epub Jul. 25, 2017.
Kramer et al., Thermal Decomposition of NaNO3 and KNO3. Proceedings of the Electrochemical Society. 1981:494-505.
Lara et al., Energy integration of high and low temperature solid sorbents for CO2 capture. Energy Procedia. 2017;114:2380-9.
Lashof et al., Relative contributions of greenhouse gas emissions to global warming. Nature. Apr. 5, 1990;344:529-31.
Lee et al., Potential flue gas impurities in carbon dioxide streams separated from coal-fired power plants. J. Air & Waste Mange. Assoc. Jun. 2009;59:725-32.

(56) References Cited

OTHER PUBLICATIONS

Leung et al., An overview of current status of carbon dioxide capture and storage technologies. Renewable and Sustainable Energy Reviews. 2014;39:426-43. Epub Aug. 2, 2014.

Likens et al., Acid Rain: A Serious Regional Environmental Problem. Science. Jun. 14, 1974;184(4142):1176-9.

Lin et al., The mechanism of coal gas desulfurization by iron oxide sorbents. Chemosphere. 2015;121:62-7. Epub Nov. 27, 2014.

Lu et al., Calcium Oxide Based Sorbents for Capture of Carbon Dioxide at High Temperatures. Ind. Eng. Chem. Res. 2006;45:3944-9. Epub May 3, 2006.

Mazzotti et al., Equilibrium theory-based analysis of nonlinear waves in separation processes. Annual Review of Chemical and Biomolecular Engineering. 2013;4:119-41. Epub Feb. 28, 2013.

Memon et al., Alkali Metal $CO_2$ Sorbents and the Resulting Metal Carbonates: Potential for Process Intensification of Sorption-Enhanced Steam Reforming. Environ. Sci. Technol. 2017;51;12-27. Epub Dec. 7, 2016.

Mess et al., Product Layer Diffusion during the Reaction of Calcium Oxide with Carbon Dioxide. Energy and Fuels. 1999;13:999-1005. Epub Jul. 22, 1999.

Misiak et al., Next Generation Post-combustion Capture: Combined $CO_2$ and $SO_2$ Removal. Energy Procedia. Dec. 2013;37:1150-9.

Mitsui et al., High Temperature Sulfidation and Oxidation Behavior of Sputter-Deposited Al-refractory Metal Alloys. Materials Transactions, JIM. 1996;37(3):379-82.

Miyamoto et al., KM CDR Process™ Project Update and the New Novel Solvent Development. Energy Procedia. 2017;114:5616-23.

Mrowec, The Problem of Sulfur in High-Temperature Corrosion. Oxidation of Metals. 1995;44(1/2):177-209.

Nakagawa et al., A Novel Method of $CO_2$ Capture from High Temperature Gases. J. Electrochem. Soc. Apr. 1998;145(4):1344-6.

Nielsen et al., Atmospheric chemistry and environmental impact of the use of amines in carbon capture and storage (CCS). Chemical Society Reviews. 2012;41:6684-704.

Oko et al., Current Status and Future Development of Solvent-Based Carbon Capture. Int. J. Coal Sci. Technol. 2017;4(1):5-14. Epub Feb. 27, 2017.

Pachauri et al., Climate Change 2014: Synthesis Report. Contribution of Working Groups I, II and III to the Fifth Assessment Report of the Intergovernmental Panel on Climate Change [Core Writing Team, R.K. Pachauri and L.A. Meyer (eds.)]. IPCC, Geneva, Switzerland. 2015:169 pages.

Pearson et al., An Update on the Development of the CSIRO's CS-Cap Combined $CO_2$ and $SO_2$ Capture Process. Energy Procedia. 2017;114:1721-8.

Perejon et al., The Calcium-Looping technology for $CO_2$ capture: On the important roles of energy integration and sorbent behavior. Applied Energy. 2016;162:787-807. Epub Nov. 11, 2015.

Plessen et al., Verwertung von Natriumsulfat. Chem. Ing. Tech. 1989;61:933-40.

Qiao et al., Alkali Nitrates Molten Salt Modified Commercial MgO for Intermediate-Temperature $CO_2$ Capture: Optimization of the Li/Na/K Ratio. Ind. Eng. Chem. Res. 2017;56:1509-17. Epub Jan. 23, 2017.

Ramkumar et al., Calcium Looping Process for Enhanced Catalytic Hydrogen Production with Integrated Carbon Dioxide and Sulfur Capture. Industrial & Engineering Chemistry Research. Ind. Eng. Chem. Res. 2011;50:1716-29. Epub Dec. 27, 2010.

Rao et al., A Technical, Economic, and Environmental Assessment of Amine-Based $CO_2$ Capture Technology for Power Plant Greenhouse Gas Control. Environmental Science & Technology. 2002;36:4467-75. Epub Sep. 6, 2002.

Reddy et al., Layered Double Hydroxides for $CO_2$ Capture: Structure Evolution and Regeneration. Ind. Eng. Chem. Res. 2006;45:7504-9. Epub Oct. 4, 2006.

Rees et al., Electrochemical $CO_2$ sequestration in ionic liquids: a perspective. Energy & Environmental Science. 2010;4:403-8. Epub Dec. 20, 2010.

Rezaei et al., SOx/NOx Removal from Flue Gas Streams by Solid Adsorbents: A Review of Current Challenges and Future Directions. Energy Fuels. 2015;29(9):5467-86. Epub Aug. 4, 2015.

Robinson, Sulfur Removal and Recovery. Springer Handbook of Petroleum Technology. Springer International Publishing. 2017:649-73.

Rochelle et al., Aqueous piperazine as the new standard for $CO_2$ capture technology. Chemical Engineering Journal. 2011;171:725-33. Epub Feb. 24, 2011.

Rochelle, Amine Scrubbing for $CO_2$ Capture. Science. Sep. 25, 2009;325:1652-4.

Rochelle, Thermal degradation of amines for $CO_2$ capture. Current Opinion in Chemical Engineering. 2012;1:183-90.

Rockstrom et al., A roadmap for rapid decarbonization. Science. Mar. 24, 2017;355(6331):1269-71.

Rodriguez et al., Interaction of Sulfur with Well-Defined Metal and Oxide Surfaces: Unraveling the Mysteries behind Catalyst Poisoning and Desulfurization. Accounts of Chemical Research. 1999;32(9):719-28. Epub Jun. 16, 1999.

Rogelj et al., Energy system transformations for limiting end-of-century warming to below 1.5° C. Nature Climate Change. Jun. 2015;5:519-27.

Rubin et al., The outlook for improved carbon capture technology. Progress in Energy and Combustion Science. 2012;38:630-71. Epub May 12, 2012.

Schmalensee et al., Lessons Learned from Three Decades of Experience with Cap and Trade. Review of Environmental Economics and Policy. 2017;11(1):59-79.

Schorr et al., Gas Turbine NOx Emissions Approaching Zero—Is it Worth the Price? GE Power Generation. General Electric Company. Schenectady, NY. 1999:11 pages.

Sexton et al., Evaluation of Reclaimer Sludge Disposal from Post-combustion $CO_2$ Capture. Energy Procedia. 2014;63:926-39.

Shartsis et al., Viscosity and Electrical Resistivity of Molten Alkali Borates. J. Am. Ceram. Soc. Oct. 1, 1953;36(10):319-26.

Shimizu et al., A Twin Fluid-Bed Reactor for Removal of $CO_2$ from Combustion Processes. Trans IChemE. Jan. 1999;77(A):62-8.

Singh et al., A review on methods of flue gas cleaning from combustion of biomass. Renewable and Sustainable Energy Reviews. 2014;29:854-64. Epub Oct. 2, 2013.

Singh et al., Shell Cansolv $CO_2$ capture technology: Achievement from First Commercial Plant. Energy Procedia. 2014;63:1678-85. Epub Dec. 31, 2014.

Song, $CO_2$ conversion and utilization: an overview. ACS Symposium Series, American Chemical Society. Washington, DC. 2002:29 pages.

Sötz et al., Molten salt chemistry in nitrate salt storage systems: Linking experiments and modeling. Energy Procedia. 2018;155:503-13.

Spengler et al., Acid air and health. Environmental Science & Technology. 1990;24(7):946-56.

Srivastava et al., Flue Gas Desulfurization: The State of the Art. Journal of the Air & Waste Management Association. Dec. 2001;51:1676-88.

Stanger et al., Oxyfuel Combustion for $CO_2$ Capture in Power Plants. Int. J. Greenh. Gas Control. 2015;40:55-125. Epub Aug. 4, 2015.

Strohle et al., Simulation of the Carbonate Looping Process for Post-Combustion $CO_2$ Capture from a Coal-Fired Power Plant. Chem. Eng. Technol. 2009;32(3):435-42.

Subha et al., Enhanced $CO_2$ Absorption Kinetics in Lithium Silicate Platelets Synthesized by a Sol-gel Approach. J. Mater. Chem. A. 2014;2:12792. Author manuscript provided. 9 pages.

Sun et al., Abatement technologies for high concentrations of NOx and $SO_2$ removal from exhaust gases: A review. Critical Reviews in Environmental Science and Technology. 2016;46(2):119-42. Epub Sep. 23, 2015.

Sun et al., Ceramics Bonding Using Solder Glass Frit. J. Electron. Mater. 2004;33(12):1516-23.

Tian et al., Inherent potential of steelmaking to contribute to decarbonisation targets via industrial carbon capture and storage. Nature Communications. 2018;9:4422. 8 pages.

(56) References Cited

OTHER PUBLICATIONS

Veawab et al., Corrosion Behavior of Carbon Steel in the CO2 Absorption Process Using Aqueous Amine Solutions. Ind. Eng. Chem. Res. 1999;38:3917-24. Epub Sep. 8, 1999.

Venegas et al., Kinetic and Reaction Mechanism of CO2 Sorption on Li4SiO4: Study of the Particle Size Effect. Ind. Eng. Chem. Res. 2007;46:2407-12. Epub Mar. 9, 2007.

Veneman et al., Continuous CO2 Capture in a Circulating Fluidized Bed Using Supported Amine Sorbents. Chem. Eng. J. 2012;207-208:18-26. Epub Jun. 30, 2012.

Wachi et al., Mass Transfer with Chemical Reaction and Precipitation. Chem. Eng. Sci. 1991;46:1027-33.

Wang et al., Amine reclaiming technologies in post-combustion carbon dioxide capture. Journal of Environmental Sciences. 2015;27:276-89. Epub Nov. 12, 2014.

Wang et al., Recent advances in solid sorbents for CO 2 capture and new development trends. Energy & Environmental Science. 2014;7:3478-518. Author manuscript provided. 46 pages.

Wang et al., Subpilot Demonstration of the Carbonation-Calcination Reaction (CCR) Process: High-Temperature CO2 and Sulfur Capture from Coal-Fired Power Plants. Industrial & Engineering Chemistry Research. 2010;49:5094-101. Epub Feb. 17, 2010.

Wang et al., Synthesis of High-Temperature CO2 Adsorbents from Organo-Layered Double Hydroxides with Markedly Improved CO2 Capture Capacity. Energy Environ. Sci. 2012;5:7526-30.

Wang et al., Thermodynamic Optimization of the Na2O—B2O3 Pseudo-Binary System. J. Phase Equilibria. 2003;24(1):12-20.

Watkins et al., Diffusion of Multi-Isotopic Chemical Species in Molten Silicates. Geochim. Cosmochim. Acta. 2014;139:313-26. Epub May 9, 2014.

Weiland et al., Effect of Heat-Stable Salts on Amine Absorber and Regenerator Performance. Conference Proceedings Presented at Fall Meeting of AIChE, Austin, Texas. Nov. 7, 2004:13 pages.

Wieckol-Ryk et al., Analysis of Biomass Blend Co-Firing for Post Combustion CO2 Capture. Sustainability. 2018;10:923. 15 pages. Epub Mar. 22, 2018.

Xiang et al., Experimental and Modeling Studies on Sulfur Trioxide of Flue Gas in a Coal-Fired Boiler. Energy & Fuels. 2017;31:6284-97. Epub May 16, 2017.

Xiao et al., A Citrate Sol-gel Method to Synthesize Li2ZrO3 Nanocrystals with Improved CO2 Capture Properties. J. Mater. Chem. 2011;21:3838-42.

Xu et al., Mathematically modeling fixed-bed adsorption in aqueous systems. Journal of Zhejiang University—Science A. 2013;14(3):155-76.

Yi et al., Continuous Operation of the Potassium-Based Dry Sorbent CO2 Capture Process with Two Fluidized-Bed Reactors. Int. J. Greenh. Gas Control. 2007;1:31-6. Epub Feb. 21, 2007.

Yin et al., Calcium Looping for CO2 Capture at a Constant High Temperature. Energy & Fuels. 2014;28:307-18. Epub Sep. 13, 2013.

Yin et al., High-Temperature Pressure Swing Adsorption Process for CO2 Separation. Energy & Fuels. 2012;26:169-75. Epub Oct. 26, 2011.

Yu et al., Nitrosamines and Nitramines in Amine-Based Carbon Dioxide Capture Systems: Fundamentals, Engineering Implications, and Knowledge Gaps. Environmental Science & Technology. 2017;51:11522-36. Epub Sep. 25, 2017.

Yun, Unusual adsorber dynamics due to S-shaped equilibrium isotherm. Korean Journal of Chemical Engineering. 2000;17(5):613-7.

Zhang et al., Phase Transfer-Catalyzed Fast CO2 Absorption by MgO-Based Absorbents with High Cycling Capacity. Adv. Mater. Interfaces. 2014;1:1400030. 6 pages.

Zhu et al., System and Processes of Pre-Combustion Carbon Dioxide Capture and Separation. In Pre-combustion Carbon Dioxide Capture Materials; Wang, Q., Ed.; Royal Society of Chemistry. London, United Kingdom. 2018:281-334.

Final Office Action for U.S. Appl. No. 17/090,146 dated May 27, 2022.

Sada et al., Solubility of carbon dioxide in molten alkali halides and nitrates and their binary mixtures. J. Chem. Eng. Data. 1981; 26(3):279-81.

\* cited by examiner

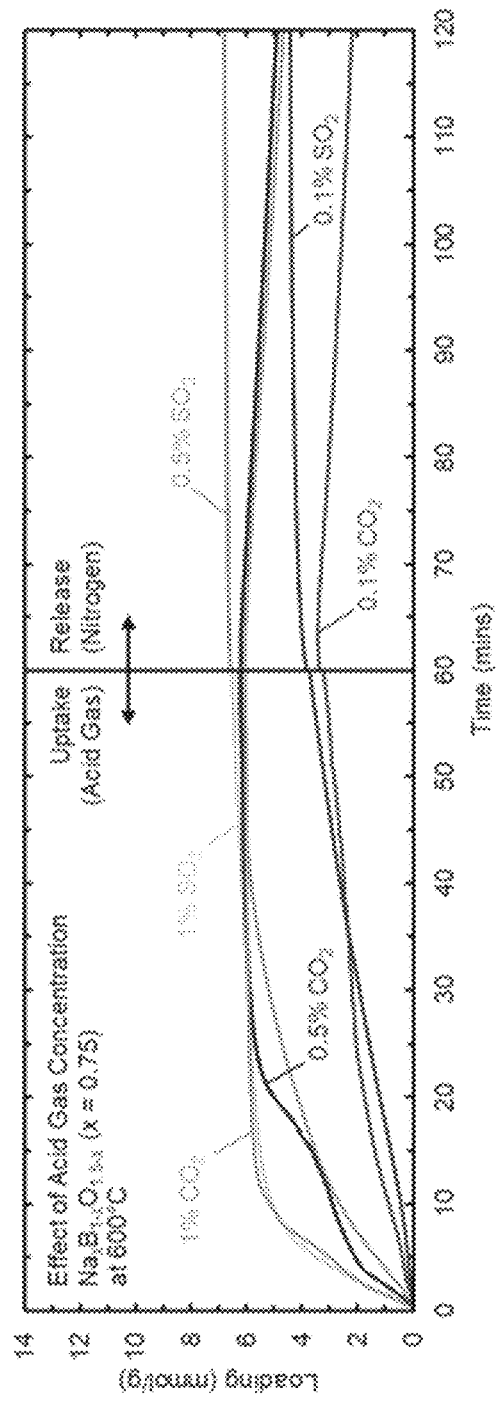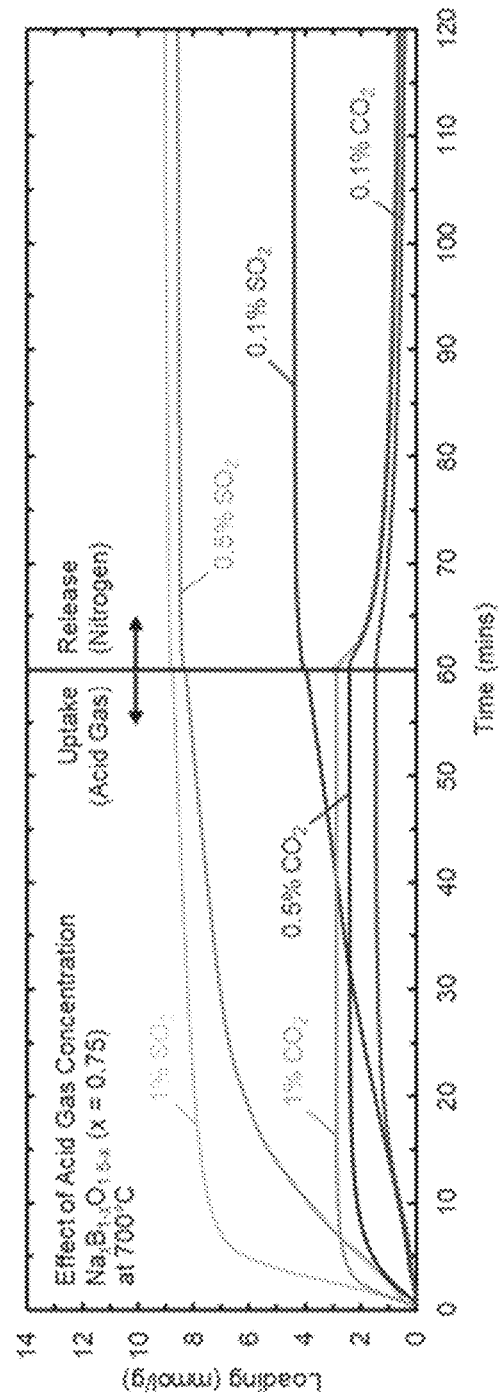
FIG. 3A
FIG. 3B

TREATMENT OF ACID GASES USING MOLTEN ALKALI METAL BORATES, AND ASSOCIATED METHODS OF SEPARATION

RELATED APPLICATIONS

This application is a continuation of U.S. patent application Ser. No. 17/090,180, filed Nov. 5, 2020, and entitled "Treatment of Acid Gases Using Molten Alkali Metal Borates and Associated Methods of Separation," which claims priority under 35 U.S.C. § 119(e) to U.S. Provisional Patent Application No. 62/971,488, filed Feb. 7, 2020, and entitled "Treatment of Acid Gases Using Molten Alkali Metal Borates, and Associated Methods of Separation," and U.S. Provisional Application No. 62/932,410, filed Nov. 7, 2019, and entitled "Process for Regenerating Sorbents at High Temperatures," each of which is incorporated herein by reference in its entirety for all purposes.

TECHNICAL FIELD

The removal of acid gases that are not carbon dioxide using sorbents that include salts in molten form, and related systems and methods, are generally described.

SUMMARY

The removal of acid gases that are not carbon dioxide using sorbents that include salts in molten form, and related systems and methods, are generally described. The subject matter of the present invention involves, in some cases, interrelated products, alternative solutions to a particular problem, and/or a plurality of different uses of one or more systems and/or articles.

Certain aspects are related to methods. In some embodiments, the method comprises exposing a sorbent, the sorbent comprising a salt in molten form, to an environment containing a non-$CO_2$ acid gas such that at least a portion of the non-$CO_2$ acid gas interacts with the sorbent and at least a portion of the non-$CO_2$ acid gas is removed from the environment.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIGS. 3A-3D show, in accordance with some embodiments, the dependence of acid gas concentration on loading for $Na_xB_{1-x}O_{1.5-x}$ (x=0.75) at (A) 600° C., and (B) 700° C., and for $(Li_{0.5}Na_{0.5})_xB_{1-x}O_{1.5-x}$ (x=0.75) at (C) 600° C., and (D) 700° C.

DETAILED DESCRIPTION

Figure 1:
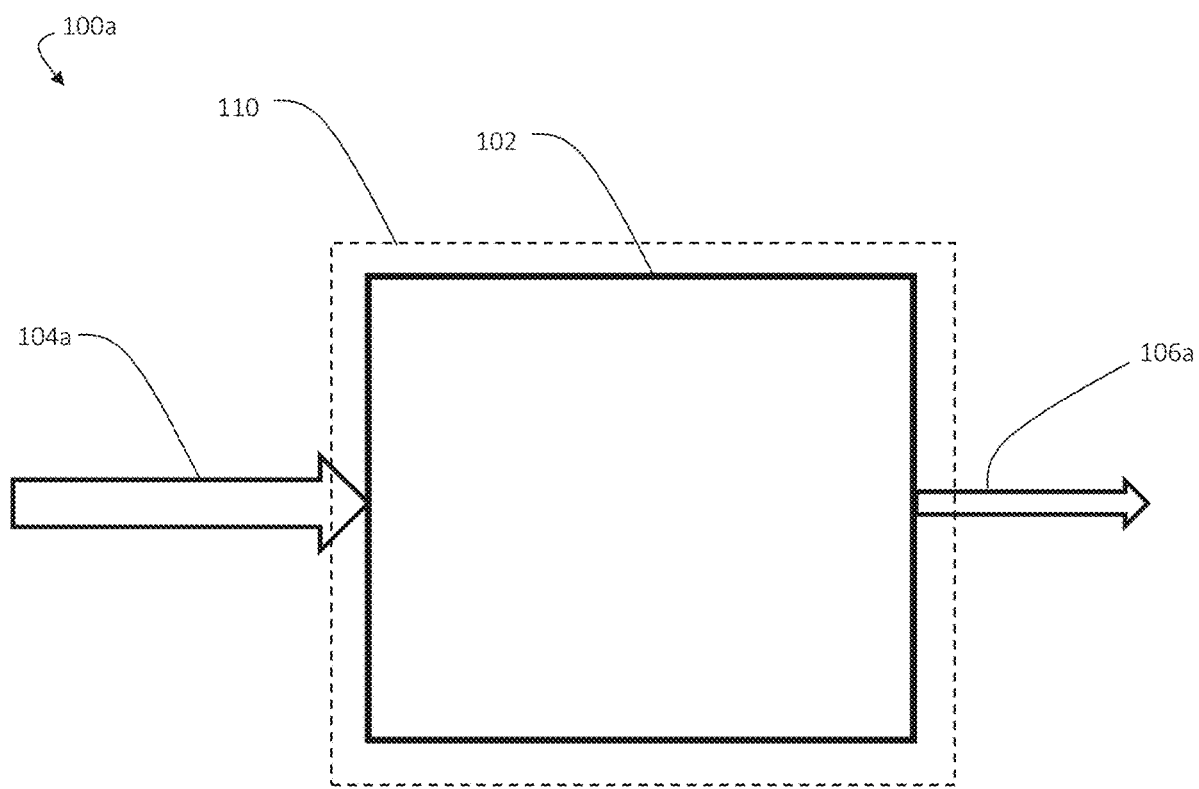
FIG. 1 is, in accordance with certain embodiments, a schematic diagram of a sorbent being exposed to an environment containing non-carbon dioxide acid gas.

The removal of acid gases (including carbon dioxide and acid gases that are not carbon dioxide) from industrial streams may find applications in the energy and chemicals industries, in particular the environmentally responsible production of energy from fossil fuels. Acid gases may be environmental pollutants, as greenhouse gases or producers of acid rain, and in many cases, these acid gases may be severely harmful to human health. Streams often contain multiple acid gases at high temperatures; however, in conventional systems multiple separate low temperature processes are typically deployed in series to treat each acid gas one at a time. A method by which multiple acid gases can be captured and separated at high temperatures, without detrimentally impacting the performance of the system is therefore of keen interest and is described below and elsewhere herein.

In certain embodiments, molten alkali metal borates can be used as sorbents to remove acid gas(es) that are not $CO_2$ (also referred to herein as non-$CO_2$ acid gas(es)) from streams. Certain embodiments are related to the application of molten alkali metal borates in a continuously circulating system for the removal and separation of multiple acid gases at high temperatures. In accordance with certain embodiments, each acid gas interacts differently with the molten alkali metal borates such that each species can be separated from others at distinct points in the high temperature system.

In certain embodiments, the product streams are upconentrated at high temperatures either by release as a gas or physical separation of the solids from the recirculating liquid.

Certain aspects of the present disclosure are directed to the removal of non-$CO_2$ acid gases using a sorbent that include salt in molten form. In some embodiments, the sorbent may act as a sequestration material for one or more non-$CO_2$ acid gases. In some embodiments, the removal of the non-$CO_2$ acid gas may occur at an elevated temperature (e.g., at or above the melting temperature of the salt, such that at least the unreacted molten salt remains in molten form). The inventors have appreciated and understood that certain sorbents described herein may remove a variety of acid gases, including carbon dioxide. In certain cases, certain sorbents may sequester non-$CO_2$ acid gases. In addition, in some embodiments, certain sorbents may preferentially sequester non-$CO_2$ acid gases over carbon dioxide, which may advantageously be useful in separating carbon dioxide from non-$CO_2$ acid gases.

While much of the disclosure herein is focused on the treatment of non-$CO_2$ acid gases, it should be understood that the sorbents described herein may also sequester (in addition to the non-$CO_2$ acid gas) carbon dioxide.

In accordance with certain embodiments, a sorbent may be exposed to an environment containing a non-$CO_2$ acid gas. A non-$CO_2$ acid gas is any acid gas that is not carbon dioxide. Non-limiting examples of non-$CO_2$ acid gases include, sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_5$), and/or carbonyl sulfide (COS). Exposure of the sorbent to (and removal of) other acid gases is also possible.

According to certain embodiments, the sorbent is exposed to the non-$CO_2$ acid gas under conditions favoring sequestration of the non-$CO_2$ acid gas. For example, in accordance with certain embodiments, a sorbent that comprises a salt in molten form can be exposed to the environment containing the non-$CO_2$ acid gas in a manner facilitating high contact between the two, e.g., the sorbent can be flowed (optionally flowed continuously) and/or sprayed during exposure of the sorbent to an environment containing the non-$CO_2$ acid gas. The flowing and/or spraying of the sorbent, during exposure of the sorbent to an environment containing the non-$CO_2$ acid gas, may advantageously increase the rate of the non-$CO_2$ acid gas capture by the sorbent relative to the rate of the non-$CO_2$ acid gas capture by an entirely solid sorbent. For example, the sorbent comprising a salt in molten form may be flowed and/or sprayed in one direction while an environment comprising the non-$CO_2$ acid gas is flowed in a different direction, e.g., in the opposite direction, in a crosscurrent or countercurrent type operation to maximize heat and/or mass transfer between the sorbent and the environment.

Uptake of the non-$CO_2$ acid gas by a sorbent in accordance with the invention can be at any of a variety of desirable levels. Uptake by a sorbent comprising a salt in molten form, with the salt including an alkali metal cation and a boron oxide anion and/or a dissociated form thereof, may be as much as or greater than 5 mmol of the non-$CO_2$ acid gas per gram of sorbent within 1 minute of exposure to an environment containing the non-$CO_2$ acid gas, a significantly faster rate of uptake than for solid particulate sorbents of similar composition under similar conditions.

In addition, the ability to flow the sorbent comprising a salt in molten form facilitates, in accordance with certain embodiments, a continuous sequestration process of non-carbon dioxide acid gas(es), in which a non-$CO_2$ acid gas-loaded sorbent can be flowed from an adsorber vessel to a desorber vessel, and/or an unloaded sorbent can be flowed from the desorber vessel to the adsorber vessel, for a plurality of cycles without halting the process. Continuous operation provides, in some embodiments, advantages including but not limited to a reduced duration of a non-$CO_2$ acid gas capture process, potentially reduced energy input required in the non-$CO_2$ acid gas capture process, and the ability to refresh poisoned sorbent with a purge rather than taking a unit offline. As is described elsewhere herein, a non-$CO_2$ acid gas or a mixture of non-$CO_2$ acid gas may also contain at least some carbon dioxide. Certain of the methods described herein may advantageously be used to separate $CO_2$ from non-$CO_2$ acid gases and/or one type of non-$CO_2$ acid gas from other types of non-$CO_2$ acid gases.

Another important advantage associated with the use of a sorbent comprising a salt in molten form, in accordance with certain embodiments, is the ability to use the sorbent at an elevated temperature, e.g., at a temperature greater than or equal to the melting temperature of the sorbent, e.g., greater than or equal to 200° C. The temperature can be higher as well, e.g., greater than or equal to 250° C., greater than or equal to 300° C., greater than or equal to 350° C., greater than or equal to 400° C., greater than or equal to 450° C., or greater than or equal to 500° C., or higher. In some embodiments in which the sorbent is used at an elevated temperature, any of a variety of suitable amounts of the sorbent (e.g., greater than or equal to 1 wt %, greater than or equal to 10 wt %, greater than or equal to 50 wt %, greater than or equal to 75 wt %, greater than or equal to 90 wt %, greater than or equal to 99 wt %, or all of the sorbent) will be at that elevated temperature (e.g., greater than or equal to 200° C., greater than or equal to 250° C., greater than or equal to 300° C., greater than or equal to 350° C., greater than or equal to 400° C., greater than or equal to 450° C., greater than or equal to 500° C., and/or within any of the other temperature ranges mentioned above or elsewhere herein). As used herein, temperature of operation refers to the temperature of the sorbent itself, which can be essentially equal to or different from the temperature of the environment to which the sorbent is exposed.

In certain embodiments, the process can optionally take place in a pressure swing operation. Generally, in a pressure swing operation in certain embodiments described herein, the sorbent is exposed to an environment having a first partial pressure of non-$CO_2$ acid gas, during exposure of the sorbent to an environment containing the acid gas, and subsequently the non-$CO_2$ acid gas-loaded sorbent is exposed to a second environment having second lower partial pressure of the non-$CO_2$ acid gas (e.g., 0 bar of the non-$CO_2$ acid gas), regenerating unloaded sorbent. This pressure swing operation may be repeated for a plurality of cycles once the sorbent has been regenerated. The first partial pressure of the non-$CO_2$ acid gas may be, in some embodiments, at least 0.000001 bar, at least 0.0001 bar, at least 0.01 bar, or at least 1 bar. The first partial pressure of the non-$CO_2$ acid gas may be, in some embodiments, at most 30 bar, at most 20 bar, at most 10 bar, or at most 5 bar. Combinations of the above-referenced ranges are also possible (e.g., between or equal to 0.000001 bar and 30 bar, between or equal to 0.01 bar and 20 bar, between or equal to 0.1 bar and 10 bar, between or equal to 1 bar and 5 bar). Other ranges are also possible. The second partial pressure of the non-$CO_2$ acid gas may be, in some embodiments, less than the first partial pressure of the non-$CO_2$ acid gas by at least 0.000001 bar, at least 0.0001 bar, at least 0.01 bar, or at least 1 bar. The second partial pressure of the non-$CO_2$ acid gas may be, in some embodiments, less than the first partial pressure of the non-$CO_2$ acid gas by at most 30 bar, at most 20 bar, at most 10 bar, or at most 5 bar. Combinations of the above-referenced ranges are also possible (e.g., between or equal to 0.001 bar and 30 bar less, between or equal to 0.01 bar and 20 bar less, between or equal to 0.1 bar and 10 bar less, between or equal to 1 bar and 5 bar less). Other ranges are also possible.

The process can optionally take place in a temperature swing operation. Generally in a temperature swing operation, in accordance with certain embodiments described herein, the sorbent is exposed to a first temperature, during exposure of the sorbent to an environment containing non-$CO_2$ acid gas, and subsequently the non-$CO_2$ acid gas loaded sorbent is exposed to a second higher temperature in a second environment containing less or no non-$CO_2$ acid gas, regenerating unloaded sorbent. This temperature swing operation may be repeated for a plurality of cycles once the sorbent has been regenerated. The first temperature may be greater than or equal to the melting temperature of the sorbent, e.g., greater than or equal to 200° C. The first temperature can be higher as well, e.g., greater than or equal to 250° C., greater than or equal to 300° C., greater than or equal to 350° C., greater than or equal to 400° C., greater than or equal to 450° C., or greater than or equal to 500° C. or higher, and/or less than or equal to 1000° C. In some embodiments, the second temperature is equal to the first temperature. The second temperature may be, in some embodiments, greater than the first temperature by at least 10° C., at least 50° C., at least 100° C., at least 200° C., at least 300° C., at least 400° C., or at least 500° C. The second temperature may be, in some embodiments, greater than the first temperature by at most 1000° C., at most 900° C., at most 800° C., at most 700° C., or at most 600° C. Combinations of the above-referenced ranges are also possible (e.g., between or equal to 10° C. and 300° C. greater, between or equal to 200° C. and 400° C. greater, between or equal to 400° C. and 1000° C. greater). Other ranges are also possible.

It is noted that unless specified otherwise, temperatures and other conditions described herein are at approximately atmospheric pressure, although deviation from atmospheric pressure can occur while still meeting the objectives of the invention. Those of ordinary skill can select different pressures to achieve the results outlined herein.

Certain embodiments are related to a sorbent material. As used herein, the phrase "sorbent" is used to describe a material that is capable of removing non-$CO_2$ acid gas (optionally along with $CO_2$) from an environment containing non-$CO_2$ acid gas. In some embodiments, the sorbent may function as a sequestration material.

Certain aspects are related to a sorbent that comprises a salt in molten form, the composition of which salt can be selected to have a low melting temperature relative to other salts such that less energy is required to melt the salt. In addition, the composition of the salt can be selected in order to tune the melting point (e.g., melting temperature at 1 atm) of the salt, e.g., to approach or match the temperature at which the non-$CO_2$ acid gas, to which the salt is exposed, is emitted from a source of non-$CO_2$ acid gas.

In certain embodiments, the salt is in molten form. For example, in some embodiments, a solid salt comprising an alkali metal cation and a boron oxide anion (and/or a dissociated form thereof) can be heated above its melting temperature which results in the solid transitioning into a liquid state. According to certain embodiments, the salt comprising an alkali metal cation and a boron oxide anion (and/or a dissociated form thereof) is a salt having a melting point between or equal to 200° C. and 1000° C. (or between 200° C. and 700° C.) when at atmospheric pressure. Those of ordinary skill in the art would understand that a molten salt is different from a solubilized salt (i.e., a salt that has been dissolved within a solvent).

The salt in molten form can have a number of chemical compositions. According to certain embodiments, the salt in molten form comprises at least one alkali metal cation and at least one boron oxide anion and/or a dissociated form thereof.

The term "alkali metal" is used herein to refer to the following six chemical elements of Group 1 of the periodic table: lithium (Li), sodium (Na), potassium (K), rubidium (Rb), cesium (Cs), and francium (Fr).

In some embodiments, the at least one alkali metal cation comprises cationic lithium (Li), sodium (Na), potassium (K), rubidium (Rb), and/or cesium (Cs). In some embodiments, the at least one alkali metal cation comprises cationic lithium (Li), sodium (Na), and/or potassium (K).

In some embodiments, the salt in molten form comprises at least one other metal cation. In some embodiments, the at least one other metal cation comprises an alkali metal cation, an alkaline earth metal cation, or a transition metal cation. In some embodiments, the salt in molten form comprises at least two alkali metal cations (e.g., 3 alkali metal cations). In certain embodiments, the salt in molten form comprises cationic lithium and cationic sodium.

A salt in molten form comprising cationic lithium and cationic sodium may in some embodiments provide advantages in a temperature swing operation, e.g., relative to an analogous salt in molten form comprising cationic sodium or an analogous salt in molten form comprising cationic lithium, cationic sodium, and cationic potassium. One advantage of a salt in molten form comprising cationic lithium and cationic sodium may be a higher uptake capacity of non-$CO_2$ acid gas, in a temperature range of between or equal to 500° C. and 700° C., than an analogous salt in molten form comprising cationic sodium or an analogous salt in molten form comprising cationic lithium, cationic sodium, and cationic potassium. Another advantage of a salt in molten form comprising cationic lithium and cationic sodium may be that a lesser temperature difference can be employed in a temperature swing operation for the same regeneration efficiency of the capture and release of non-$CO_2$ acid gas (e.g., a temperature difference of between or equal to 0.25 and 0.5 times the temperature difference employed for analogous salts) relative to an analogous salt in molten form comprising cationic sodium or an analogous salt in molten form comprising cationic lithium, cationic sodium, and cationic potassium.

The term "alkaline earth metal" is used herein to refer to the six chemical elements in Group 2 of the periodic table: beryllium (Be), magnesium (Mg), calcium (Ca), strontium (Sr), barium (Ba), and radium (Ra).

The "transition metal" elements are scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), roentgenium (Rg), zinc (Zn), cadmium (Cd), mercury (Hg), and copernicium (Cn).

In certain embodiments, it may be advantageous for the salt in molten form to comprise an alkali metal cation and one other metal cation at a composition at or near a eutectic composition, such that the melting temperature of the salt is lower than the melting temperature of a salt with a different composition of the alkali metal cation and the one other metal cation, reducing the energy required to attain the salt in molten form for an operation for the sequestration of non-$CO_2$ acid gas(es).

Certain of the sorbents described herein have relatively low melting temperatures and may promote sequestration (e.g., absorption) of non-$CO_2$ acid gas at relatively low temperatures. For example, components that are capable of forming eutectic compositions with each other have reduced melting points at the eutectic composition and at compositions surrounding the eutectic composition in comparison to compositions in which the components are present in other relative amounts. As another example, compositions comprising alkali metal cations and/or alkaline earth metal cations have relatively low melting points in comparison to compositions comprising other metal cations. The ability to absorb non-$CO_2$ acid gas at relatively low temperatures can be advantageous as it may, according to certain although not necessarily all embodiments, reduce the amount of energy required to absorb acid gases.

In some embodiments the sorbent comprises at least two components (e.g., metal cations, alkali metal cation(s)) that are capable of forming a eutectic composition with each other. As would be understood by one of ordinary skill in the art, a "eutectic composition" is a composition that melts at a temperature lower than the melting points of the composition's constituents. In some eutectic compositions, the liquid phase is in equilibrium with both a first solid phase and a second solid phase different from the first solid phase at the eutectic temperature. A eutectic composition that is cooled from a temperature above the eutectic temperature to a temperature below the eutectic temperature under equilibrium cooling conditions undergoes, in certain cases, solidification at the eutectic temperature to form a first solid phase and a second solid phase simultaneously from a liquid. As would also be understood by one of ordinary skill in the art, two components that are capable of forming a eutectic composition with each other are, in certain cases, also able to form non-eutectic compositions with each other. Non-eutectic compositions often undergo solidification over a range of temperatures because liquid phases may be in equilibrium with solid phases over a range of temperatures.

The term "boron oxide anion" is used herein to refer to a negatively charged ion comprising at least one boron and at least one oxygen. The boron oxide anion in the salt in molten form can be intact (e.g., in anionic $B_wO_z$ form, e.g., ($BO_3^{3-}$)) and/or the boron and oxygen can be dissociated from one another (e.g., into boron cation(s) and oxygen anion(s), e.g., as $B^{3+}$ and $O^{2-}$).

According to some embodiments, the at least one boron oxide anion comprises anionic $B_wO_z$ and/or a dissociated form thereof. In some embodiments, w is greater than 0 and less than or equal to 4. In certain embodiments, w is between or equal to 1 and 4. In some embodiments, z is greater than 0 and less than or equal to 9. In certain embodiments, z is between or equal to 1 and 9. In some embodiments, the at least one boron oxide anion comprises anionic $BO_3$, $BO_4$, or $B_2O_5$ and/or a dissociated form thereof. In certain embodiments, it may be advantageous to have a salt in molten form comprise anionic $BO_3$ and/or a dissociated form thereof. A potential advantage of anionic $BO_3$ and/or a dissociated form thereof may include a greater acid gas uptake capacity of the salt in molten form during exposure to an environment containing acid gas, relative to a salt having the same alkali metal cation (and any other cations) and anionic $B_2O_5$ and/or a dissociated form thereof. Another potential advantage of anionic $BO_3$ and/or a dissociated form thereof may include a greater acid gas desorption of the salt in molten form during exposure to desorption conditions, relative to a salt having the same alkali metal cation (and any other cations) and anionic $BO_4$ and/or a dissociated form thereof.

In some embodiments, the boron oxide anion comprises $B_wO_z$ and/or a dissociated form thereof, wherein w is greater than 0 and less than or equal to 4 and z is greater than 0 and less than or equal to 9.

In some embodiments, the fractional stoichiometry of a salt described herein can be expressed as $M_xB_{1-x}O_y$, wherein x is a mixing ratio and is between zero and 1. In some embodiments, the fractional stoichiometry is that of the salt in solid form, e.g., before melting. In some embodiments, the fractional stoichiometry is that of the salt in molten form, e.g., after melting. In certain embodiments, y=1.5−x. "M" in this formula refers to the metal cation(s) (e.g., an alkali metal cation, a combination of an alkali metal cation and at least one other metal cation) in a sorbent described herein. For example, in some embodiments, the fractional stoichiometry of a salt described herein can be expressed as $A_xB_{1-x}O_y$, where 0<x<1 and A is an alkali metal (e.g., Li, Na, K). In certain such embodiments, y=1.5−x.

As used herein, the term "mixing ratio" of an alkali metal cation or combination of metal cations in a sorbent refers to the ratio of moles of metal cation(s) in a sorbent to the total of moles of metal cation(s) plus moles of boron in the sorbent. For example, the mixing ratio of sodium in $Na_3BO_3$ is 3/(3+1)=0.75; the mixing ratio of alkali metals in $(Li_{0.5}Na_{0.5})_3BO_3$ is (0.5*3+0.5*3)/(3+1)=0.75. In some embodiments, the mixing ratio is at least 0.5, at least 0.6, or at least 0.667. In some embodiments, the mixing ratio is at most 0.9, at most 0.835, at most 0.8, at most 0.75, or at most 0.7. Combinations of the above-referenced ranges are also possible (e.g., between or equal to 0.5 and 0.9, between or equal to 0.6 and 0.8, between or equal to 0.7 and 0.8). Other ranges are also possible. Without wishing to be bound by theory, there may be a mixing ratio (for a certain alkali metal cation or combination of metal cations) below which the acid gas uptake capacity of the sorbent is less than desirable. Without wishing to be bound by theory, there may be a mixing ratio (for a certain alkali metal cation or combination of metal cations) above which the regeneration efficiency of the sorbent is less than desirable. In some embodiments, the alkali metal comprises lithium (Li), sodium (Na), potassium (K), and/or a mixture of these. In some embodiments, the alkali metal comprises Li and Na in equal amounts.

Non-limiting examples of the salt in molten form include but are not limited to $Na_3BO_3$ (which could also be written as, e.g., $Na_{0.75}B_{0.5}O_{0.75}$), $Na_5BO_4$ (which could also be written as, e.g., $Na_{0.83}B_{0.17}O_{0.67}$), $Na_4B_2O_5$ (which could also be written as, e.g., $Na_2BO_{2.5}$), $K_3BO_3$ (which could also be written as, e.g., $K_{0.75}B_{0.25}O_{0.75}$), $(Li_{0.5}Na_{0.5})_3BO_3$, and/or $(Li_{0.33}Na_{0.33}K_{0.33})_3BO_3$, or a combination thereof, in molten form.

In some embodiments, the salt of the sorbent that is in molten form may be accompanied by portions of that salt that are not molten. That is to say, complete melting of all of the salt type(s) that are present in molten form is not required in all embodiments. In some embodiments, at least 10 wt %, at least 20 wt %, at least 30 wt %, at least 40 wt %, at least 50 wt %, at least 60 wt %, at least 70 wt %, at least 80 wt %, at least 90 wt %, or more of the salt present within the sorbent is molten. In some embodiments, less than 100 wt %, less than 99 wt %, less than 90 wt %, or less of the salt that is present within the sorbent is molten. Combinations of the above-referenced ranges are also possible (e.g., at least 10 wt % and less than 100 wt %). Other ranges are also possible.

In some embodiments, the sorbent comprises at least one salt comprising at least one alkali metal cation and at least one boron oxide anion and/or a dissociated form thereof (e.g., including, but not limited to, $Na_3BO_3$, $Na_5BO_4$, $Na_4B_2O_5$, $K_3BO_3$, $(Li_{0.5}Na_{0.5})_3BO_3$, and/or $(Li_{0.33}Na_{0.33}K_{0.33})_3BO_3$) for which at least 10 wt %, at least 20 wt %, at least 30 wt %, at least 40 wt %, at least 50 wt %, at least 60 wt %, at least 70 wt %, at least 80 wt %, at least 90 wt %, or more of that salt is molten. In some embodiments, the sorbent comprises at least one salt comprising at least one alkali metal cation and at least one boron oxide anion and/or a dissociated form thereof (e.g., including, but not limited to, $Na_3BO_3$, $Na_5BO_4$, $Na_4B_2O_5$, $K_3BO_3$, $(Li_{0.5}Na_{0.5})_3BO_3$, and/or $(Li_{0.33}Na_{0.33}K_{0.33})_3BO_3$) for which less than 100 wt %, less than 99 wt %, less than 90 wt %, or less of that salt is molten. Combinations of the above-referenced ranges are also possible. Other ranges are also possible.

In some embodiments, in the sorbent, the total amount of all salts that comprise at least one alkali metal cation and at least one boron oxide anion and/or a dissociated form thereof and that is in molten form is at least 10 wt %, at least 20 wt %, at least 30 wt %, at least 40 wt %, at least 50 wt %, at least 60 wt %, at least 70 wt %, at least 80 wt %, at least 90 wt %, or more. As a non-limiting exemplary illustration, in some embodiments, the sorbent can be a combination of 50 grams of $Na_3BO_3$, 50 grams of $Na_5BO_4$, and 50 grams of $Na_4B_2O_5$, and in some such embodiments, at least 15 grams (i.e., 10 wt % of 150 total grams) of the total amount of $Na_3BO_3$, $Na_5BO_4$, and $Na_4B_2O_5$ is molten. In certain embodiments, in the sorbent, the total amount of all salts that comprise at least one alkali metal cation and at least one boron oxide anion and/or a dissociated form thereof and that is in molten form is less than 100 wt %, less than 99 wt %, less than 90 wt %, less than 50%, less than 40%, less than 30%, less than 20%, or less. Combinations of the above-referenced ranges are also possible (e.g., at least 10 wt % and less than 100 wt %). Other ranges are also possible.

In some embodiments, a sorbent further comprises an additive. Examples of types of additives that may be included in a sorbent include but are not limited to corrosion inhibitors, viscosity modifiers, wetting agents, high-temperature surfactants, and scale inhibitors. In some embodiments, the sorbent comprises a plurality of additives (e.g., two, three, four, or more).

In some embodiments, during exposure to an environment comprising a non-$CO_2$ acid gas, at least a portion of the salt in molten form chemically reacts with at least some of the non-$CO_2$ acid gas and forms one or more products (e.g., comprising a carbonate, comprising nitrate, comprising nitrite, comprising sulfate, comprising sulfite) within the sorbent. These one or more products (e.g., carbonate products, nitrate products, nitrite products, sulfate products, sulfite products) may be in solid form or in liquid form, depending, e.g., on the temperature and/or composition of the salt (e.g., alkali metal borate salt).

In some embodiments, during exposure to an environment comprising non-$CO_2$ acid gas, at least a portion of the salt in molten form chemically reacts with at least some of the non-$CO_2$ acid gas(es) and forms solid particles (e.g., comprising a carbonate, a sulfate, a sulfite, a nitrate, a nitrite) within the sorbent, increasing the viscosity of the sorbent. These solid particles loaded with non-$CO_2$ acid gas(es) may be flowed within remaining salt in molten form using a slurry pump to a desorber to be regenerated (e.g., regeneration of salt in molten form from the solid particulates), or alternatively these solid particles may be regenerated within the same vessel in which the solid particles were formed.

In some embodiments, a relatively large percentage of the sorbent is made up of a salt in molten form. For example, in some embodiments, at least 10 weight percent (wt %), at least 20 wt %, at least 30 wt %, at least 40 wt %, at least 50 wt %, at least 60 wt %, at least 70 wt %, at least 80 wt %, at least 90 wt %, or more of the sorbent is made up of a salt in molten form. In some embodiments, at most 100 wt %, at most 99 wt %, or at most 90 wt % of the sorbent is made up of a salt in molten form. Combinations of the above-referenced ranges are also possible (e.g., between or equal to 10 wt % and 100 wt %, between or equal to 20 wt % and 99 wt %, between or equal to 50 wt % and 90 wt %). Other ranges are also possible. In some embodiments, all of the sorbent is molten. In other embodiments, only a portion of the sorbent is molten.

In some embodiments, a relatively large percentage of the sorbent is chemically converted to non-$CO_2$ acid gas-loaded solid particles during sequestration (e.g., absorption). For example, in some embodiments, at least 1 wt %, at least 10 wt %, or at least 20 wt % of the sorbent is made up of non-$CO_2$ acid gas-loaded solid particles. In some embodiments, at most 90 wt %, at most 80 wt %, or at most 50 wt % of the sorbent is made up of non-$CO_2$ acid gas-loaded solid particles. Combinations of the above-referenced ranges are also possible (e.g., between or equal to 1 wt % and 90 wt %, between or equal to 10 wt % and 80 wt %, between or equal to 10 wt % and 50 wt %, between or equal to 20 wt % and 50 wt %). Other ranges are also possible.

In some embodiments, the sorbent also comprises a hydroxide of an alkali metal. For example, in some embodiments, the sorbent comprises NaOH, KOH, and/or LiGH. According to certain embodiments, a hydroxide of an alkali metal can be formed as a by-product of a reaction between the sorbent and a non-$CO_2$ acid gas.

According to certain embodiments, the sorbent is capable of interacting with a non-$CO_2$ acid gas such that a relatively large amount of the non-$CO_2$ acid gas is sequestered. In certain embodiments, the sorbent is capable of interaction with mixtures of non-$CO_2$ acid gases. In some embodiments, the sorbent may preferentially sequester non-$CO_2$ acid gas(es) over $CO_2$, and thus may facilitate the separation of non-$CO_2$ acid gases from $CO_2$. Interaction between the sorbent and acid gases (e.g., non-$CO_2$ acid gases) can involve a chemical reaction, adsorption, and/or diffusion. In some embodiments, a plurality of non-$CO_2$ acid gases interacts with the sorbent such that at least a portion of the plurality of non-$CO_2$ acid gases are removed from the environment.

For example, in certain embodiments, the sorbent is capable of interacting with a non-$CO_2$ acid gas such that at least 0.01 mmol of the non-$CO_2$ acid gas is sequestered (e.g., from an environment, e.g., from an atmosphere, from a stream) per gram of the sorbent. In some embodiments, the sorbent is capable of interacting with a non-$CO_2$ acid gas such that at least 0.1 mmol, at least 0.5 mmol, at least 2.0 mmol, or at least 10.0 mmol of the non-$CO_2$ acid gas is sequestered (e.g., from an environment, e.g., from an atmosphere, from a stream) per gram of the sorbent. In certain embodiments, the sorbent is capable of interacting with the non-$CO_2$ acid gas such that at most 20.0 mmol, at most 18.0 mmol, at most 16.0 mmol, at most 14.0 mmol, or at most 12.0 mmol of the acid gas is sequestered (e.g., from an environment, e.g., from an atmosphere, from a stream) per gram of the sorbent. Combinations of the above-referenced ranges are also possible (e.g., between or equal to 0.1 mmol per gram and 20.0 mmol per gram, between or equal to 0.5 mmol per gram and 16.0 mmol per gram, between or equal to 2.0 mmol per gram and 12.0 mmol per gram).

According to certain embodiments, the sorbent is capable of interacting with the non-$CO_2$ acid gas such that a relatively large amount of the non-$CO_2$ acid gas is sequestered even when the non-$CO_2$ acid gas concentration in the environment (e.g., in an atmosphere, in a stream) is relatively low. For example, in some embodiments, the sorbent is capable of sequestering at least 0.01 mmol, at least 0.1 mmol, at least 0.5 mmol, at least 2.0 mmol, at least 10.0 mmol and/or at most 20.0 mmol, at most 18.0 mmol, at most 16.0 mmol, at most 14.0 mmol, or at most 12.0 mmol of the non-$CO_2$ acid gas per gram of the sorbent when the sorbent is exposed to a steady state environment containing as little as 50 mol %, as little as 25 mol %, as little as 10 mol %, or as little as 1 mol % of the non-$CO_2$ acid gas (e.g., with the balance of the environment being argon).

According to certain embodiments, the sorbent is capable of interacting with a non-$CO_2$ acid gas such that a relatively large amount of the non-$CO_2$ acid gas is sequestered even at relatively low temperatures. For example, in some embodiments, the sorbent is capable of sequestering at least 0.01 mmol, at least 0.1 mmol, at least 0.5 mmol, at least 2.0 mmol, at least 10.0 mmol and/or at most 20.0 mmol, at most 18.0 mmol, at most 16.0 mmol, at most 14.0 mmol, or at most 12.0 mmol of the non-$CO_2$ acid gas per gram of the sorbent when the sorbent is at a temperature of 1000° C. or less, at a temperature of 850° C. or less, at a temperature of 600° C. or less, at a temperature of 550° C. or less, or at a temperature of 520° C. or less (and/or, at a temperature of at least 200° C., at least 300° C., at least 400° C., at least 450° C., or at least 500° C.). Combinations of the above-referenced ranges are also possible (e.g., between or equal to 200° C. and 1000° C., between or equal to 200° C. and 600° C., between or equal to 400° C. and 550° C.). Other ranges are also possible.

According to certain embodiments, the salt of the sorbent has a melting temperature at 1 atm within a range high enough to provide a high rate of sequestration of the non-$CO_2$ acid gas(es), but not so high as to make the sequestration of the non-$CO_2$ acid gas(es) an overly energy-intensive process. In some embodiments, the salt of the sorbent has a melting temperature at 1 atm of at least 200° C., at least 300° C., at least 400° C., at least 450° C., or at least 500° C. In some embodiments, the salt of the sorbent has a melting temperature at 1 atm of at most 1000° C., at most 850° C., at most 600° C., at most 550° C., or at most 520° C.

Combinations of the above-referenced ranges are also possible (e.g., between or equal to 200° C. and 1000° C., between or equal to 200° C. and 600° C., between or equal to 400° C. and 550° C.). Other ranges are also possible.

According to certain embodiments, the sorbent is capable of interacting with a non-$CO_2$ acid gas such that a relatively large amount of the non-$CO_2$ acid gas is sequestered over a relatively short period of time. For example, in some embodiments, the sorbent is capable of sequestering at least 0.01 mmol, at least 0.1 mmol, at least 0.5 mmol, at least 2.0 mmol, at least 10.0 mmol and/or at most 20.0 mmol, at most 18.0 mmol, at most 16.0 mmol, at most 14.0 mmol, or at most 12.0 mmol of the non-$CO_2$ acid gas per gram of the sorbent when the sorbent is exposed to an environment containing the non-$CO_2$ acid gas for a period of 24 hours or less, 12 hours or less, 8 hours or less, 4 hours or less, 1 hour or less, 30 minutes or less, 10 minutes or less, or 2 minutes or less (and/or, at least 10 seconds, at least 20 seconds, at least 30 seconds, or at least 1 minute). Combinations of the above-referenced ranges are also possible (e.g., between or equal to 10 seconds and 24 hours, between or equal to 20 seconds and 12 hours, between or equal to 30 seconds and 8 hours, between or equal to 1 minute and 4 hours, between or equal to 1 minute and 10 minutes, between or equal to 1 minute and 2 minutes). Other ranges are also possible.

The amount of non-$CO_2$ acid gas sequestered by a sorbent can be determined, for example, using thermogravimetric analysis.

In addition to sorbents, methods of capturing non-$CO_2$ acid gas using sorbents are also described. For example, certain of the sorbents described herein can be used to remove non-$CO_2$ acid gas from a chemical process stream (e.g., the exhaust stream of a combustion system) and/or from an environment containing non-$CO_2$ acid gas (e.g., an environment within a reactor or other unit operation).

In some embodiments, a method comprises melting a solid sorbent comprising a salt described herein (e.g., an alkali metal borate), and using the molten sorbent to sequester a non-$CO_2$ acid gas. In some embodiments, the salt (e.g., alkali metal borate) in molten form comprises an alkali metal cation, a boron oxide anion, a boron cation, and/or an oxygen anion. In certain embodiments, all of these species are present in the salt in molten form. In some embodiments, the salt (e.g., alkali metal borate) in molten form comprises an alkali metal cation, a boron cation, and an oxygen anion.

Certain aspects are related to methods of sequestering a non-$CO_2$ acid gas using a sorbent described herein. Certain aspects are directed to a method comprising exposing a sorbent described herein to an environment containing the non-$CO_2$ acid gas such that at least some of the non-$CO_2$ acid gas interacts with the sorbent and at least a portion of the non-$CO_2$ acid gas is sequestered from the environment. In some such embodiments, a relatively large percentage of the non-$CO_2$ acid gas (e.g., at least 25 wt %, at least 50 wt %, at least 75 wt %, at least 90 wt %, at least 95 wt %, at least 99 wt %, at least 99.9 wt %, or more of the non-$CO_2$ acid gas) is removed from the environment. In certain embodiments, essentially all of the non-$CO_2$ acid gas is removed from the environment.

In certain embodiments, a method comprises exposing a sorbent at a temperature of at least 200° C. to an environment containing non-$CO_2$ acid gas such that at least some of the non-$CO_2$ acid gas interacts with the sorbent and is sequestered from the environment.

The sorbent can be exposed to an environment containing a non-$CO_2$ acid gas in a number of ways. For example, in some embodiments, the sorbent can be added to an environment (e.g., an atmosphere, a stream) containing the non-$CO_2$ acid gas. According to certain embodiments, the environment containing the non-$CO_2$ acid gas can be transported into (e.g., flowed through) a container holding the sorbent. In certain embodiments, the sorbent comprising a salt in molten form can be flowed or sprayed through a container in which the environment resides and/or is flowed in the same and/or opposite direction to the flow direction or spray direction of the sorbent. Combinations of these methods are also possible. The non-$CO_2$ acid gas to which the sorbent is exposed is generally in fluidic form (e.g., in the form of a gas and/or a supercritical fluid). In certain embodiments, at least a portion of the non-$CO_2$ acid gas to which the sorbent is exposed is in the form of a subcritical gas.

The environment containing a non-$CO_2$ acid gas to which the sorbent is exposed can be, for example, contained within a chemical processing unit operation. Non-limiting examples of such unit operations include reactors (e.g., packed bed reactors, fluidized bed reactors, falling film columns, bubble columns), separators (e.g., particulate filters, such as diesel particulate filters), and mixers. According to certain embodiments, the environment containing the non-$CO_2$ acid gas is contained within a falling film column. According to certain embodiments, the environment containing the non-$CO_2$ acid gas is part of and/or derived from the output of a combustion process.

Figure 2:
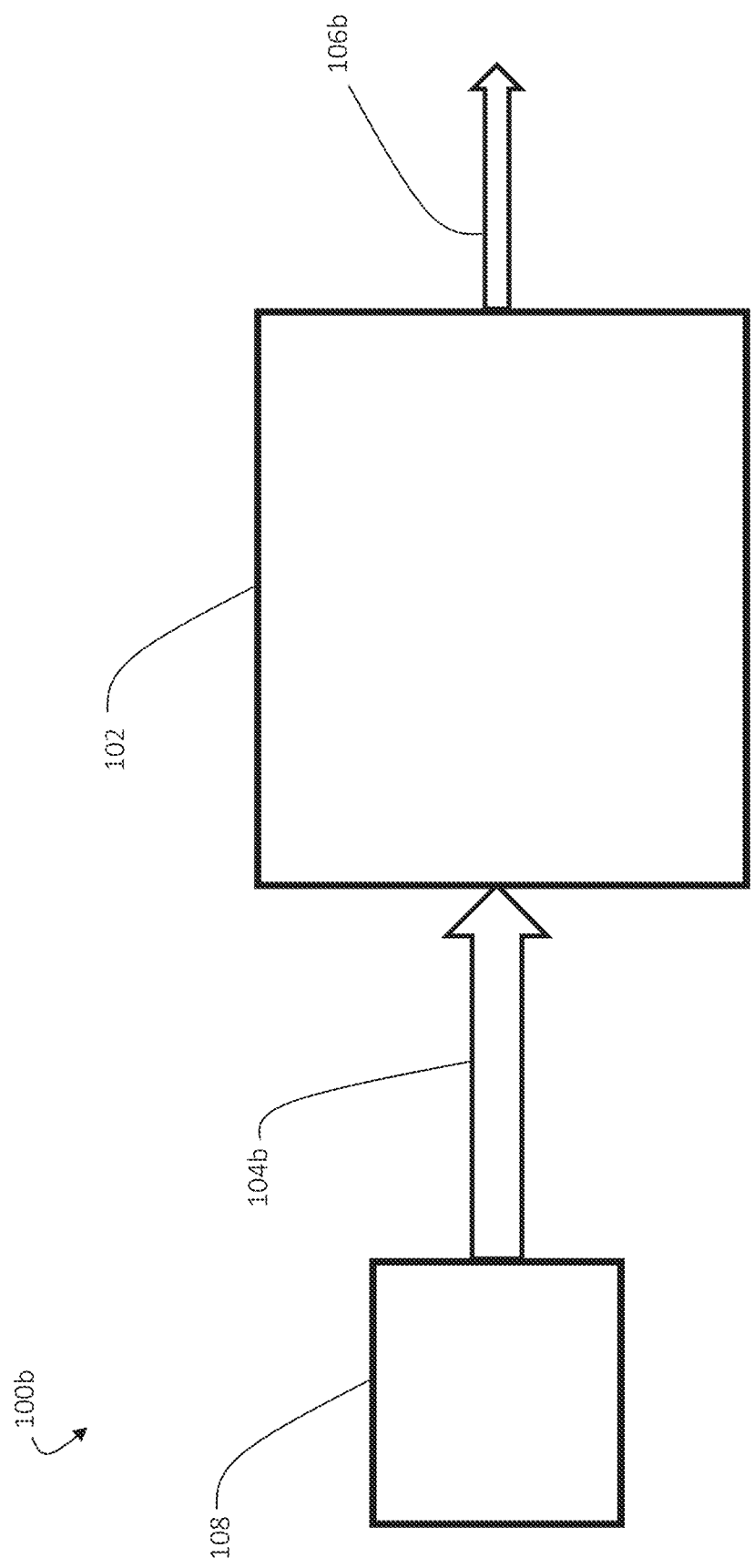
FIG. 2 is, in accordance with certain embodiments, a schematic diagram of a sorbent being exposed to an environment containing non-carbon dioxide acid gas that is part of and/or derived from the output of a combustion process.

In certain embodiments, a method comprises exposing the sorbent to a stream containing a non-$CO_2$ acid gas (optionally also containing $CO_2$). FIG. 1 is, in accordance with certain embodiments, a schematic diagram of a sorbent being exposed to an environment containing non-$CO_2$ acid gas. As shown in FIG. 1, method 100a may comprise exposing sorbent 102 to stream 104a containing non-$CO_2$ acid gas. The stream to which the sorbent is exposed can be, for example, part of and/or derived from a stream of a chemical process containing non-$CO_2$ acid gas. For example, in some embodiments, the stream to which the sorbent is exposed can be part of and/or derived from an output (e.g., an exhaust stream) of a combustion process. FIG. 2 is, in accordance with certain embodiments, a schematic diagram of a sorbent being exposed to an environment containing a non-$CO_2$ acid gas that is part of and/or derived from the output of a combustion process. As shown in FIG. 2, method 100b may comprise exposing sorbent 102 to stream 104b containing the non-$CO_2$ acid gas that is part of and/or derived from the output of combustion process 108. In some embodiments, at least a portion of an output stream of a combustion process is directly transported through the sorbent. For example, as shown in FIG. 2, at least a portion of stream 104b of combustion process 108 is directly transported through sorbent 102.

The stream to which the sorbent is exposed can be, for example, transported through a chemical processing unit operation. Non-limiting examples of such unit operations include reactors (e.g., packed bed reactors, fluidized bed reactors, falling film columns, bubble columns), separators (e.g., particulate filters, such as diesel particulate filters), and mixers.

For example, referring back to FIG. 1, in some embodiments, sorbent 102 is located within optional reactor 110. According to certain embodiments, the stream to which the sorbent is exposed is transported through a falling film column.

The sorbents described herein can be used to remove non-$CO_2$ acid gas generated by a variety of systems. For example, in some embodiments, the sorbent is used to remove non-$CO_2$ acid gas from an exhaust stream from a boiler (e.g., in a power plant), from an exhaust stream from an integrated gasification combined cycle (IGCC) power plant, from an exhaust stream from an internal combustion engine (e.g., from a motor vehicle), from an exhaust stream from a pyro-processing furnace (e.g., as used in the cement industry), and/or from a stream from a hydrogen generation process (e.g., by sorption enhanced steam reforming (SESR)).

The concentration of non-$CO_2$ acid gas in the fluid to which the sorbent is exposed can be within a variety of ranges. In some embodiments, the environment (e.g., an atmosphere, a stream) to which the sorbent is exposed contains non-$CO_2$ acid gas in an amount of at least 1 ppm. In certain embodiments, the environment (e.g., an atmosphere, a stream) to which the sorbent is exposed contains non-$CO_2$ acid gas in an amount of at least 10 ppm, at least 1000 ppm, at least 0.01 mol %, at least 0.1 mol %, at least 1 mol %, at least 10 mol %, at least 50 mol %, or at least 99 mol %. The sorbent can be exposed, in some embodiments, to essentially pure non-$CO_2$ acid gas. In some embodiments, a method involves exposing the sorbent to an environment that contains non-$CO_2$ acid gas in an amount of at least 1 ppm.

Certain embodiments comprise exposing the sorbent to an environment (e.g., an atmosphere, a stream) comprising non-$CO_2$ acid gas such that at least a portion of the non-$CO_2$ acid gas interacts with the sorbent and at least a portion of the non-$CO_2$ acid gas is sequestered from the environment (e.g., from the atmosphere, from the stream). For example, as shown in FIG. 1, at least a portion of the non-$CO_2$ acid gas in stream 104a interacts with sorbent 102 and is sequestered from stream 104a, thereby being absent from stream 106a. In certain embodiments, stream 106a may contain less non-$CO_2$ acid gas than stream 104a after at least a portion of the non-$CO_2$ acid gas in stream 104a interacts with sorbent 102 and is sequestered from stream 104a. The interaction between the non-$CO_2$ acid gas that is sequestered and the sorbent can take a variety of forms. For example, in certain embodiments, the non-$CO_2$ acid gas is absorbed into the sorbent. In some embodiments, the non-$CO_2$ acid gas is adsorbed onto the sorbent. In some embodiments, the non-$CO_2$ acid gas chemically reacts with the sorbent. In some embodiments, the non-$CO_2$ acid gas diffuses into the sorbent. Combinations of two or more of these mechanisms (i.e., absorption, adsorption, chemical reaction, and/or diffusion) are also possible. In some embodiments, sequestration of the $CO_2$ does not produce a solid precipitant.

In some embodiments, captured non-$CO_2$ acid gas forms a solid suspended in the liquid sorbent and is upconcentrated by physical separation. In some embodiments, the physical separation uses a cross-flow filter. In some embodiments, the cross-flow filter is operated at a temperature of at least 200° C. (or at least 400° C., at least 600° C., or at least 800° C.). In some embodiments, the cross-flow filter is operated at a temperature of no greater than 1000° C. In some embodiments, the separation comprises centrifugation. In certain embodiments, the separation comprises crystallization. In some embodiments, the separation comprises sedimentation. Combinations of these are also possible.

According to certain embodiments, a relatively large amount of a non-$CO_2$ acid gas is sequestered by the sorbent (e.g., from an atmosphere, from a stream) during the exposure of the sorbent to the non-$CO_2$ acid gas. For example, in certain embodiments, at least 0.01 mmol of the non-$CO_2$ acid gas is sequestered (e.g., from an environment, e.g., from an atmosphere, from a stream) per gram of the sorbent. In some embodiments, at least 0.1 mmol, at least 0.5 mmol, at least 2.0 mmol, or at least 10.0 mmol of the non-$CO_2$ acid gas is sequestered (e.g., from an environment, e.g., from an atmosphere, from a stream) per gram of the sorbent. In certain embodiments, at most 20.0 mmol, at most 18.0 mmol, at most 16.0 mmol, at most 14.0 mmol, or at most 12.0 mmol of the non-$CO_2$ acid gas is sequestered (e.g., from an environment, e.g., from an atmosphere, from a stream) per gram of the sorbent. Combinations of the above-referenced ranges are also possible (e.g., between or equal to 0.01 mmol per gram and 20.0 mmol per gram, between or equal to 0.1 mmol per gram and 18.0 mmol per gram, between or equal to 2.0 mmol per gram and 12.0 mmol per gram). Other ranges are also possible. In some embodiments, including in some methods described herein, between or equal to 0.01 mmol and 20.0 mmol of the non-$CO_2$ acid gas is sequestered from the environment per gram of the sorbent.

According to certain embodiments, at least a portion of the non-$CO_2$ acid gas interacts with the sorbent and is sequestered from an environment containing the non-$CO_2$ acid gas, such as from an atmosphere or a stream as noted elsewhere herein, over a period of at least 10 seconds, at least 20 seconds, at least 30 seconds, or at least 1 minute. According to certain embodiments, at least a portion of the non-$CO_2$ acid gas interacts with the sorbent and is sequestered from an environment containing the non-$CO_2$ acid gas, such as from an atmosphere or a stream as noted elsewhere herein, over a period of 24 hours or less, 12 hours or less, 8 hours or less, 4 hours or less, 1 hour or less, 30 minutes or less, 10 minutes or less, or 2 minutes or less. Combinations of the above-referenced ranges are also possible (e.g., between or equal to 10 seconds and 24 hours, between or equal to 20 seconds and 12 hours, between or equal to 30 seconds and 8 hours, between or equal to 1 minute and 4 hours, between or equal to 1 minute and 10 minutes, between or equal to 1 minute and 2 minutes). Other ranges are also possible.

In certain embodiments, at least 0.01 mmol of the non-$CO_2$ acid gas is sequestered (e.g., from the atmosphere, from the stream) per gram of the sorbent per 24 hours. In some embodiments, at least 0.1 mmol, at least 0.5 mmol, at least 2.0 mmol, or at least 10.0 mmol of the non-$CO_2$ acid gas is sequestered from the stream per gram of the sorbent per 24 hours. According to some embodiments, at most 20.0 mmol, at most 18.0 mmol, at most 16.0 mmol, at most 14.0 mmol, or at most 12.0 mmol of the non-$CO_2$ acid gas is sequestered from the stream per gram of the sorbent per 24 hours. Combinations of the above-referenced ranges are also possible (e.g., between or equal to 0.01 mmol per gram and 20.0 mmol per gram, between or equal to 0.1 mmol per gram and 18.0 mmol per gram, between or equal to 2.0 mmol per gram and 12.0 mmol per gram). Other ranges are also possible.

In certain embodiments, the temperature of the sorbent is less than or equal to 1000° C. during at least a portion of the sequestration of the non-$CO_2$ acid gas. In certain embodiments, the sorbent is at a temperature greater than the melting temperature of the salt during at least a portion of the sequestration of the non-$CO_2$ acid gas, such that the salt is in molten form. In certain embodiments, the temperature of the sorbent is at most 1000° C., at most 850° C., at most 600° C., at most 550° C., or at most 520° C. during at least a portion of the sequestration of the non-$CO_2$ acid gas. In some embodiments, the temperature of the sorbent is at least 200° C., at least 300° C., at least 400° C., at least 450° C., or at least 500° C. during at least a portion of the sequestration of the non-$CO_2$ acid gas. Combinations of the above-referenced ranges are also possible (e.g., between or equal to 200° C. and 1000° C., between or equal to 200° C. and 600° C., between or equal to 400° C. and 550° C.). Other ranges are also possible.

In certain embodiments, the temperature of the environment containing non-$CO_2$ acid gas is less than or equal to 1000° C. during at least a portion of the sequestration of the non-$CO_2$ acid gas. In certain embodiments, the temperature of the environment containing non-$CO_2$ acid gas is at most 1000° C., at most 850° C., at most 600° C., at most 550° C., or at most 520° C. during at least a portion of the sequestration of the non-$CO_2$ acid gas. In some embodiments, the temperature of the environment containing non-$CO_2$ acid gas is at least 200° C., at least 300° C., at least 400° C., at least 450° C., or at least 500° C. during at least a portion of the sequestration of the non-$CO_2$ acid gas. Combinations of the above-referenced ranges are also possible (e.g., between or equal to 200° C. and 1000° C., between or equal to 200° C. and 600° C., between or equal to 400° C. and 550° C.). Other ranges are also possible.

In some embodiments, a relatively large weight percentage of the sorbent sequesters non-$CO_2$ acid gas during sequestration. For example, in some embodiments, at least 0.01 wt %, at least 10 wt %, or at least 20 wt % of the sorbent sequesters non-$CO_2$ acid gas during sequestration. In some embodiments, at most 100%, at most 90 wt %, at most 80 wt %, or at most 50 wt % of the sorbent sequesters non-$CO_2$ acid gas during sequestration. Combinations of the above-referenced ranges are also possible (e.g., between or equal to 0.01 wt % and 100 wt %, between or equal to 10 wt % and 90 wt %, between or equal to 10 wt % and 80 wt %, between or equal to 20 wt % and 50 wt %). Other ranges are also possible.

In some embodiments, a method further comprises regenerating the sorbent by removing, from the sorbent, at least 50 mol % of the non-$CO_2$ acid gas sequestered by the sorbent. In some embodiments, at least 60 mol %, at least 70 mol %, at least 80 mol %, at least 90 mol %, at least 95 mol %, at least 99 mol %, or at least 99.9 mol % of the non-$CO_2$ acid gas sequestered by the sorbent is removed from the sorbent. In some embodiments, the sorbent remains in a liquid state throughout the sequestration and regeneration process. For example, in some embodiments, the salt remains in a liquid state throughout the sequestration and regeneration process.

In certain embodiments, a method comprises performing at least one sequestration/regeneration cycle (e.g., at least one temperature swing cycle, at least one pressure swing cycle). Each sequestration/regeneration cycle is made up of a sequestration step (in which non-$CO_2$ acid gas is sequestered by the sorbent) followed by a regeneration step (in which non-$CO_2$ acid gas is released by the sorbent). According to certain embodiments, the sorbent can be subject to a relatively large number of sequestration/regeneration cycles while maintaining the ability to sequester and release relatively large amounts of non-$CO_2$ acid gas.

The sorbent can be exposed to any of the environments (e.g., atmospheres, streams) described above or elsewhere herein during one or more (or all) of the sequestration steps of the one or more sequestration/regeneration cycles. One or more (or all) of the regeneration steps of the sequestration/regeneration cycles can be performed using a variety of suitable second environments (e.g., fluids, atmospheres, streams). In some embodiments, regeneration of the sorbent can be performed by flowing an inert gas (e.g., argon, $N_2$) over the sorbent. Non-limiting examples of suitable environment components that can be used during the regeneration step include a flow of 100 mol % $N_2$, or a flow of air.

In some embodiments, the gas space in a desorber vessel (further described elsewhere herein) comprises a non-$CO_2$ acid gas, e.g., greater than or equal to 0.0001 volume % of the gas space in the desorber vessel is made of non-$CO_2$ acid gas(es). As would be understood by a person of ordinary skill in the art, the volume % of gas space made of the non-$CO_2$ acid gas can be determined by dividing the partial pressure of a non-$CO_2$ acid gas in the gas space by the total pressure of the gases in the gas space and multiplying by 100%. As used herein, the term "gas space" refers to a space or a volume occupied by gas in a vessel (e.g., an adsorber vessel, a desorber vessel). In some embodiments, the gas space in a desorber vessel is at the same pressure as the gas space in an adsorber vessel (further described elsewhere herein). In other embodiments, the gas space in a desorber vessel at a different (e.g., lower) pressure than the gas space in an adsorber vessel.

In some embodiments, the gas space in a vessel, in a system configured for batch operation (further described elsewhere herein), during a regeneration step comprises non-$CO_2$ acid gas, e.g., greater than or equal to 0.0001 volume % of the gas space in the vessel is made of non-$CO_2$ acid gas(es). In some embodiments, the gas space in a vessel, in a system configured for batch operation, during a regeneration step is at the same pressure as the gas space in the vessel during a sequestration step. In other embodiments, the gas space in a vessel, in a system configured for batch operation, during a regeneration step is at a different (e.g., lower) pressure than the gas space in the vessel during a sequestration step.

According to certain embodiments, a method comprises cycling the sorbent at least 2 (or at least 5, at least 10, at least 50, at least 100, at least 1000, or at least 10,000) times. In some such embodiments, during each of the 2 (or during each of the 5, each of the 10, each of the 50, each of the 100, each of the 1000, and/or each of the 10,000) sequestration steps of the cycles, the amount of non-$CO_2$ acid gas that is sequestered by the sorbent is at least 75%, at least 90%, at least 95%, at least 98%, at least 99%, or at least 99.9% of the amount of non-$CO_2$ acid gas that is sequestered by the sorbent during an equivalent sequestration step of the $1^{st}$ cycle. In some such embodiments, during each of the 2 (or during each of the 5, each of the 10, each of the 50, each of the 100, each of the 1000, and/or each of the 10,000) regeneration steps of the cycles, the amount of non-$CO_2$ acid gas that is released by the sorbent is at least 75%, at least 90%, at least 95%, at least 98%, at least 99%, or at least 99.9% of the amount of non-$CO_2$ acid gas that is released by the sorbent during an equivalent regeneration step of the $1^{st}$ cycle. In some such embodiments, the amount of non-$CO_2$ acid gas that is released by the sorbent during the regeneration step of the $1^{st}$ cycle is at least 75%, at least 90%, at least 95%, at least 98%, at least 99%, or at least 99.9% of the amount of non-$CO_2$ acid gas that is sequestered by the sorbent during the sequestration step of the $1^{st}$ cycle. In some such embodiments, the amount of non-$CO_2$ acid gas that is sequestered during the sequestration step of the $1^{st}$ cycle, the $10^{th}$ cycle, and/or the $100^{th}$ cycle is at least 0.01 mmol, at least 0.1 mmol, at least 0.5 mmol, at least 2.0 mmol, or at least 10.0 mmol (and/or at most 20.0 mmol, at most 18.0 mmol, at most 16.0 mmol, at most 14.0 mmol, or at most 12.0 mmol) per gram of the sorbent. In certain embodiments, the temperature of the sorbent during the sequestration/regeneration cycles is at most 1000° C., at most 850° C., at most 600° C., at most 550° C., or at most 520° C. (and/or at least 200° C., at least 300° C., at least 400° C., at least 450° C., or at least 500° C.). In certain embodiments, the time over which each of the sequestration steps and each of the regeneration steps occurs is 24 hours or less (or 12 hours or less, 8 hours or less, 4 hours or less, 1 hour or less, 30 minutes or less, 10 minutes or less, or 2 minutes or less, and/or at least 10 seconds, at least 20 seconds, at least 30 seconds, or at least 1 minute). In some embodiments, the steady state concentration of non-$CO_2$ acid gas in the environment to which the sorbent is exposed during the sequestration steps of the sequestration/regeneration cycles is as little as 50 mol %, as little as 25 mol %, as little as 10 mol %, or as little as 1 mol % acid gas (e.g., with the balance of the environment being argon or remaining acid gases present after sequestration of a certain acid gas).

In some embodiments, systems for sequestering non-$CO_2$ acid gas using a sorbent comprising a salt in molten form are provided. Systems described herein may be used to carry out methods described herein using sorbents described herein.

In some embodiments, a system configured for sequestering non-$CO_2$ acid gas in a batch operation is provided. A system configured for batch operation may comprise any of a number of suitable components. In some embodiments, a system configured for batch operation comprises an inlet to a vessel, the vessel, and an outlet to the vessel. In some embodiments during a sequestration step, the inlet is configured to receive a fluid rich in non-$CO_2$ acid gas, which fluid can flow from the inlet to the vessel. In certain embodiments, the vessel is configured to contain a sorbent described herein. In some embodiments during a regeneration step, the outlet is configured to receive fluid lean in non-$CO_2$ acid gas from the vessel, having a lower mole percentage of the non-$CO_2$ acid gas than the non-$CO_2$ acid gas-rich fluid, at least because some sequestration by the sorbent occurred in the vessel. In some embodiments during a regeneration step, the inlet is configured to receive energy or work (e.g., from a heated and/or pressured gas), which can flow from the inlet to the vessel. In some embodiments during a regeneration step, the outlet is configured to receive non-$CO_2$ acid gas from the vessel, due to regeneration of the sorbent in the vessel.

In some embodiments, a system configured for sequestering non-$CO_2$ acid gas in a continuous operation is provided. A system configured for continuous operation may comprise any of a number of suitable components. In some embodiments, a system configured for continuous operation comprises an inlet to an adsorber vessel, the adsorber vessel, and an outlet to the adsorber vessel. In some embodiments, a system configured for continuous operation further comprises an inlet to a desorber vessel, the desorber vessel, and an outlet to the desorber vessel. In some embodiments, a system for continuous operation further comprises a first conduit between the adsorber vessel and the desorber vessel configured to transport a sorbent loaded with non-$CO_2$ acid gas from the adsorber vessel to the desorber vessel. In some embodiments, a system further comprises a first pump configured in line with the first conduit to transport the loaded sorbent. In certain embodiments, the first pump is a slurry pump. In some embodiments, a system for continuous operation further comprises a second conduit between the adsorber vessel and the desorber vessel configured to transport unloaded sorbent from the desorber vessel to the adsorber vessel. In some embodiments, a system further comprises a second pump configured in line with the second conduit to transport the unloaded sorbent. In some embodiments, a system further comprises a heat exchanger in line with the first conduit and/or second conduit (e.g., configured for a temperature swing operation). In some embodiments, a system further comprises a re-boiler or heater fluidically connected with the desorber vessel and the pump (e.g., configured for temperature swing operation). In some embodiments, a system further comprises a compressor fluidically connected with the desorber vessel configured to output a pure acid gas stream. Systems provided herein may comprise any suitable combination of components.

Systems that are a hybrid of a system configured for batch operation and a system configured for continuous operation are also contemplated.

As used herein, "loaded" sorbent refers to sorbent at least a portion of which (e.g., between or equal to 1 wt % and 90 wt %) has sequestered non-$CO_2$ acid gas.

As used herein, "unloaded" sorbent refers to sorbent at least a portion of which (e.g., between or equal to 75 wt % and 100 wt %, between or equal to 85 wt % and 100 wt %, between or equal to 95 wt % and 100 wt %) has had a non-$CO_2$ acid gas removed.

In some embodiments, a system (e.g., a system for batch operation, a system for continuous operation) provided herein includes at least one temperature controller configured to control the temperature of a vessel (e.g., an adsorber vessel, a desorber vessel). For example, a temperature controller may be used to set the temperature of the vessel at or above the melting temperature of the salt of the sorbent, in order to maintain at least some of the salt in molten form during sequestration.

Systems (e.g., a system for batch operation, a system for continuous operation) described herein can be used for a pressure swing non-$CO_2$ acid gas separation operation at a high temperature (e.g., between or equal to 200° C. and 1000° C., between or equal to 500° C. and 700° C.) using a sorbent described herein. For example, in some embodiments, during a sequestration step (e.g., in an adsorber vessel), the partial pressure of non-$CO_2$ acid gas in a first environment to which the sorbent is exposed is between or equal to 0.000001 bar and 20 bar (e.g., between or equal to 0.1 bar and 10 bar), and the total pressure of the first environment to which the sorbent is exposed is between or equal to 1 bar and 30 bar, or between or equal to 1 bar and 50 bar. In some embodiments, the total pressure of the first environment to which the sorbent is exposed may be at least 1 bar, at least 2 bar, at least 5 bar, at least 10 bar, at least 20 bar, at least 50 bar, at least 100 bar, or more. In certain embodiments, during a sequestration step, the non-$CO_2$ acid gas is between or equal to 1 ppm and 30 mol % of the first environment (e.g., a stream). In some embodiments, during a regeneration step (e.g., in a desorber vessel), the partial pressure of non-$CO_2$ acid gas in a second environment to which the sorbent is exposed is between or equal to 0 bar and 0.2 bar, and the total pressure of the second environment to which the sorbent is exposed is between or equal to 1 bar and 20 bar. In some embodiments, the total pressure of the second environment to which the sorbent is exposed may be less than 20 bar, less than 10 bar, less than 5 bar, less than 2 bar, less than 1.5 bar, less than 1.2 bar, less than 1.1 bar, less than 1 bar, (e.g., under vacuum), less than 0.5 bar, less than 0.1 bar, or less than 0.01 bar. In some embodiments, the difference between the total pressure of the first environment and the total pressure of the second environment is between or equal to 0 bar and 20 bar. In certain embodiments, the difference between the total pressure of the first environment and the total pressure of the second environment is at least 0.1 bar, at least 1 bar, at least 5 bar, at least 10 bar, at least 50 bar, at least 100 bar, or more. In some embodiments, the difference between the partial pressure of non-$CO_2$ acid gas in the first environment and the partial pressure of non-$CO_2$ acid gas in the second environment is between or equal to 1 bar and 20 bar. Other ranges are also possible. For example, in a pressure swing operation, a sorbent may be exposed to a first environment at pressure 30 bar with a partial pressure of non-$CO_2$ acid gas of 1 bar during a sequestration step, and the sorbent may be exposed to a second environment at a pressure of 20 bar with a partial pressure of non-$CO_2$ acid gas of 0 bar during a regeneration step.

Systems (e.g., a system for batch operation, a system for continuous operation) described herein can be used for a temperature swing non-$CO_2$ acid gas separation operation at a high base temperature (e.g., between or equal to 200° C. and 900° C.). For example, in some embodiments, during a sequestration step (e.g., in an adsorber vessel), a first temperature of a sorbent is held at between or equal to 200° C. and 900° C. In some embodiments, during a regeneration step (e.g., in a desorber vessel), a second temperature of a sorbent is held at between or equal to 250° C. and 950° C. In some embodiments, the difference between the second temperature and the first temperature is between or equal to 10° C. and 500° C. (e.g., between or equal to 20° C. and 400° C., 200° C.). For example, in a temperature swing operation, a sorbent may be held at 500° C. during a sequestration step and 700° C. during a regeneration step.

In certain embodiments, at least a portion of the sorbent containing at least the portion of the non-$CO_2$ acid gas is removed from the environment. For example, in some embodiments (e.g., in some embodiments where the sorbent is not upconcentrated or regenerated), after the sorbent has captured non-$CO_2$ acid gas, the sorbent with captured acid gas may be discarded.

In some embodiments, after the sorbent has captured non-$CO_2$ acid gas, a solution can be added to the environment to precipitate at least a portion of the sorbent. In some such embodiments, the solution contains calcium ions. In certain embodiments, adding the solution results in the precipitation of $CaSO_4$. As one example, in some embodiments, limewater can be added to recover aqueous sorbent and gypsum.

U.S. Provisional Patent Application No. 62/971,488, filed Feb. 7, 2020, and entitled "Treatment of Acid Gases Using Molten Alkali Metal Borates, and Associated Methods of Separation," is incorporated herein by reference in its entirety for all purposes.

The following example is intended to illustrate certain embodiments of the present invention but does not exemplify the full scope of the invention.

Example

This example describes the removal of several non-$CO_2$ acid gases in comparison to $CO_2$ under both reducing and oxidizing environments.

An acid gas is any gas that forms an acidic solution with water. Those most relevant to industrial emissions are various oxides of sulfur ($SO_x$) and nitrogen ($NO_x$), hydrogen sulfide ($H_2S$), and carbon dioxide ($CO_2$). Typically, acid gases are environmental pollutants, such as greenhouse gases or producers of acid rain, and are, in some cases, severely harmful to human health. Recent interest in capturing $CO_2$ emissions to combat global warming, masks an older effort to treat acid gas emissions more broadly, such as non-$CO_2$ acid gases. Many lessons can be learned from these successes, both in terms of strategies for the large-scale deployment of emission control technology, and from the specific technological challenges that were overcome. Indeed, many of today's best options for carbon capture trace their roots to the treatment of other acid gases (e.g., non-$CO_2$ acid gases). For example, it was originally desirable for amines to remove $H_2S$, but not $CO_2$, in natural gas processing.

The method of capture may be the same in each case, in a sorber the acid gas is contacted with a basic sorbent to form a neutral salt, which is typically destabilized in a desorber by a change in conditions, for example temperature, with the recovered gas sent for further treatment, storage, or utilization. The basicity of the various sorbents has been tuned over decades to target specific acid gases and lately, among other process challenges, to minimize the energy penalty of the release step. Real systems present both a challenge and an opportunity in that they contain multiple acid gases at varying concentrations. The opportunity is to treat multiple acid gases simultaneously thereby reducing equipment costs and system complexity. The challenge is to manage the products and maintain ever stricter limits on acid gas emissions. A recent example of this trend can be seen in the shipping industry, where $SO_x$ emissions are being more tightly controlled from 2020 and the industry aims to cut 70% of $CO_2$ emissions by 2050.

In understanding the relevance of the various acid gases to specific industrial processes, it is convenient to distinguish between an oxidizing atmosphere, where an excess of oxidizing agent exists, and a reducing atmosphere, where no such oxidizing agent exists. If feedstock's containing sulfur are processed under an oxidizing environment sulfur is emitted in the form of $SO_x$, of which $SO_2$ is the most pertinent. Common examples include the combustion of coal, oil, natural gas, and, biomass, production of cement, and the smelting of ores. On the other hand sulfur forms $H_2S$ in reducing environments, such as those associated with pre-combustion technologies, hydrogen production, and gas-sweetening. Similarly, nitrogen is present in many feedstock's giving rise to fuel $NO_x$, of which $NO_2$ and $NO$ are the most relevant. In addition, nitrogen is present in the air making thermal $NO_x$ emissions particularly pervasive in oxidizing environments. However, in some embodiments, under a reducing atmosphere nitrogen is usually emitted rather than $NO_x$. For various high temperature sources Table 1, below, presents the typical range of uncontrolled acid gas emissions.

TABLE 1

Typical acid gas concentration by source. $CO_2$, $SO_x$, and $NO_x$ correspond to post-combustion designs while the $H_2S$ concentration corresponds to pre-combustion.

|  | $CO_2$ | $SO_x$ | $H_2S$ | $NO_x$ |
| --- | --- | --- | --- | --- |
| Coal | 12-14% | 100-4000 ppm | 0.2-3% | 100-800 ppm |
| Oil | 11-13% | 100-4000 ppm | 0.2-3% | 50-700 ppm |
| Gas | 3-4% | 10-1000 ppm | 10-1000 ppm | 10-200 ppm |
| Biomass | 3-8% | 10-200 ppm | 50-300 ppm | 50-400 ppm |
| Cement | 14-33% | 3-1200 ppm | N/A | 100-1500 ppm |
| Metals | 15-27% | 150-400 ppm | N/A | 150-300 ppm |

High temperature capture, typically around 600° C. or 700° C., may offer many advantages over lower temperature operation including greater opportunities for efficient heat recovery, so-called "sorption enhanced" designs, and different chemistries with faster kinetics and higher capacities. The recent discovery of molten alkali metal borates ($A_xB_{1-x}O_{1.5-x}$) as high temperature liquid phase sorbents for carbon capture, in some embodiments, represents a significant advance in realizing efficient low-cost carbon capture facilities. Without wishing to be bound by any theory, two distinct reaction mechanisms have been identified, one where the molten liquid reacts to form solid crystalline products and another where the molten liquid reacts to form molten liquid products. In some embodiments, the alkali metal borates with compositions, $Na_xB_{1-x}P_{1.5-x}$ (x=0.75) and $(Li_{0.5}Na_{0.5})_xB_{1-x}O_{1.5-x}$ (x=0.75) are the representative examples of "liquid-to-solid" and 'liquid-to-liquid' type sorbents, respectively.

As described herein, the interaction between other acid gases (e.g., non-$CO_2$ acid gases) and this new class of high-temperature sorbents are discussed with a focus on the opportunity-challenge presented by real systems. In some embodiments, the performance of molten alkali metal borates at the concentrations and mixtures applicable to real systems using $SO_2$ as a representative example are described, then the reaction mechanism for the industrially significant gases are described, and finally the implications on the design of high-temperature capture facilities with a comparison between the state-of-the-art in carbon capture and the molten alkali metal borates are described further below.

Experimental & Methodology Sample Preparation

Lithium hydroxide (LiOH, 98%), sodium hydroxide (NaOH, 97%), and boric acid ($H_3BO_3$, 99.5%) were purchased from Sigma-Aldrich. The alkali metal borate samples, $A_xB_{1-x}O_{1.5-x}$, where A is an alkali metal and x is the mixing ratio, were prepared from mixed precipitants of alkali metal hydroxide and boric acid. The mixtures were weighed and dissolved in 0.1 g/mL Milli-Q (Millipore) deionised water. The water was evaporated at 120° C. for several hours followed by 2 hours at 400° C. to release residual moisture and $CO_2$; a final pretreatment step at 800° C. was conducted for 60 minutes in-situ to obtain the targeted composition.

Performance Analysis

Mixtures of 1 mol % acid gas, balance nitrogen ($N_2$), were obtained (Airgas) for carbon dioxide ($CO_2$), sulfur dioxide ($SO_2$), hydrogen sulfide ($H_2S$), and nitrogen dioxide ($NO_2$). 20% $CO_2$ was mixed with 1 mol % acid gas to obtain various mixtures of 10 mol % $CO_2$ & 0.5 mol % acid gas. The performance of the sorbents was analyzed by the weight variation of the sample inside a thermogravimetric analyzer (TGA, Q50 TA Instruments) on exposure to a flow of gas. In each case, the sample mass was ~5 mg and sample gas flow rate ~30 mL/min. The final pretreatment step was carried out inside the TGA under 200 mL/min $N_2$. The weight change on exposure to acid gas was normalized by the sample mass after final pretreatment to obtain the loading in mg of gas per gram of sorbent, in some cases for better comparison the weight change was converted into mmol of acid gas using the molecular weight of the gas. Temperature ramps were carried out after final pre-treatment from 200° C. to 800° C. at 5° C./min.

Materials Characterization

The phase composition and crystallographic features were examined by powder X-ray diffractometry (XRD) and high temperature powder X-ray diffractometry (HTXRD) (XRD: PANalytical X'Pert Pro Multipurpose Diffractometer with Cu-$k_\alpha$ X-ray (Xλ=1.541 Å)), in which the samples were placed on a Pt-sheet substrate. The peaks in the XRD spectra were identified by referring to the ICDD PDF-4+2016RDB database. Samples were prepared ex-situ in a tube furnace (GSL-1800, MTI Corp), under a continuous flow of 1 mol % acid gas balance $N_2$ for 60 minutes.

Results and Discussion

From Table 1, above, some of the industrially relevant acid gas concentrations can vary by orders of magnitude. In this example, $SO_2$ is selected as a representative species at the higher end of concentrations (1 mol %, 0.5 mol %, and 0.1 mol %) where the acid gases influence would be most significant, and comparisons are drawn to $CO_2$ capture at the same concentration.

At 600° C., the performance of the sodium borate $Na_xB_{1-x}O_{1.5-x}$ (x=0.75) for $SO_2$ capture was similar to $CO_2$ capture on a molar basis (FIG. 3A). For an acid gas concentration of 1 mol % and 0.5 mol % the capacity was consistently ~6 mmol/g but, 0.1 mol % was too low for the reaction to reach completion in 60 minutes. However, there was a clear interaction between the acid gases and the sorbent even at this low concentration. Exposure to nitrogen in the release step stimulated pressure swing operation by reducing the partial pressure of the acid gas. At 600° C. $CO_2$ was very slowly released whereas $SO_2$ was retained by the sorbent with a slight increase in loading. As the acid gas concentration dropped from 0.1 mol % to 0% during exposure to nitrogen the sorbent continued to remove any left-behind $SO_2$ still present in the head space, suggesting concentrations substantially less than 0.1 mol % could be treated effectively.

At 700° C. (FIG. 3B), the capacity for $CO_2$ was reduced at lower concentrations as $CO_2$ existed in the melt below supersaturation conditions, while the capacity for $SO_2$ was elevated. Without wishing to be bound by any theory, the elevated $SO_2$ loading suggested a different reaction occurred that allowed for a higher capacity at 700° C. compared to 600° C. Release of $CO_2$ was more favorable at 700° C. but in each case $SO_2$ was retained at the capacity reached during the uptake step. This suggests that while the reaction with $CO_2$ is easily reversed the reaction with $SO_2$ is irreversible up to at least 700° C.

Figure 3C:
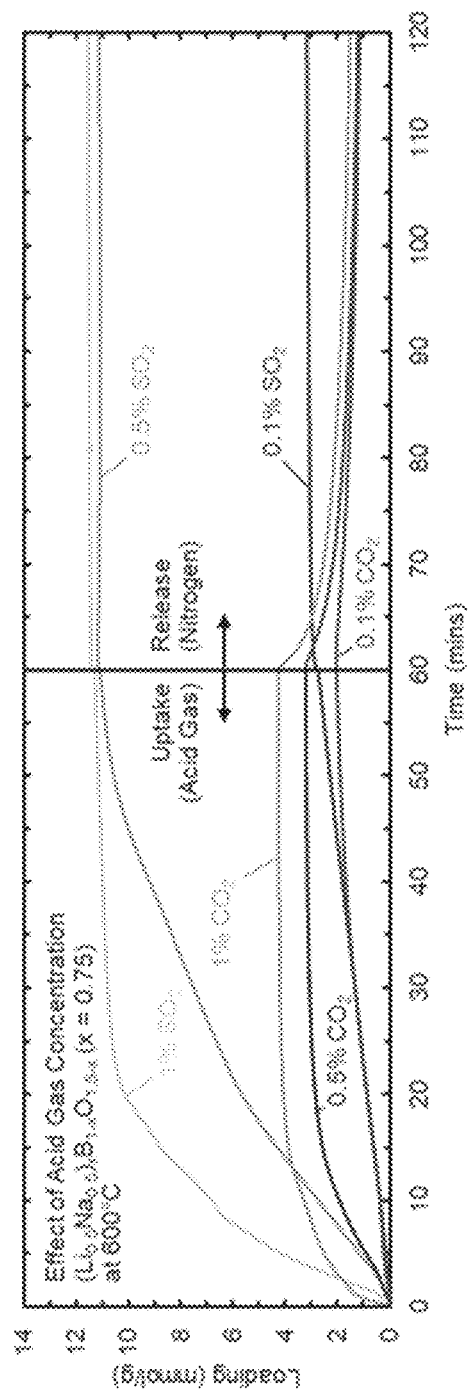

Likewise for the lithium-sodium borate $(Li_{0.5}Na_{0.5})_xB_{1-x}O_{1.5-x}$ (x=0.75) (FIG. 3C). At 600° C. the initial reaction rate closely matched that of $CO_2$ but the capacity was substantially higher. For the lithium-sodium borate, the $CO_2$ in the melt was in equilibrium with the $CO_2$ in the gas stream resulting in a gradual decrease in capacity with $CO_2$ concentration. Similar to the sodium borate, for $SO_2$ the same −11 mmol/g was reached for both 1 mol % and 0.5 mol %, 60 minutes under 0.1 mol % was insufficient for the complete reaction to take place. Also, the reaction with $CO_2$ was reversed on exposure to nitrogen but $SO_2$ was retained.

Figure 3D:
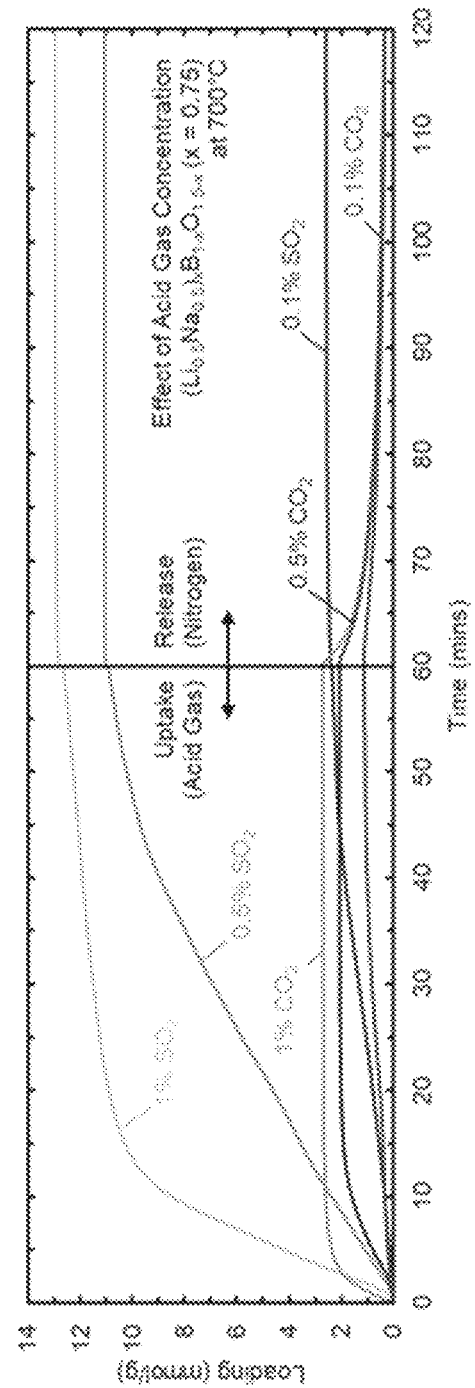

At 700° C. (FIG. 3D) the capacity for $CO_2$ was lower as the release reaction became more favorable while for $SO_2$ a similar uptake profile was observed but with a second slower process occurring at high loadings resulting in a gradual increase beyond that seen at 600° C. Again, without wishing to be bound by any theory, the release profile at 700° C. confirms the irreversibility of $SO_2$ uptake with both sodium and lithium-sodium borate.

Acid Gas Mixtures

In many real systems, multiple acid gases exist together and with societies growing environmental awareness it is expected that future facilities will require tight control of all acid gas emissions. Therefore, a mixture of 10 mol % $CO_2$ and 0.5 mol % $SO_2$ was examined, which resembles a worst-case scenario for a power plant burning high sulfur bituminous coal.

To gain an understanding of the influence of each acid gas and possible interactions between the two, a number of uptake experiments were performed including each gas individually, 10 mol % $CO_2$ ($CO_2$) and 0.5 mol % $SO_2$ ($SO_2$), and both gases together 10 mol % $CO_2$ and 0.5 mol % $SO_2$ ($CO_2$ & $SO_2$). In some variants these were followed by a change to another mixture of acid gases. Such as, 10 mol % $CO_2$ followed by 0.5 mol % $SO_2$ ($CO_2 \rightarrow SO_2$), 0.5 mol % $SO_2$ followed by 10 mol % $CO_2$ ($SO_2 \rightarrow CO_2$), and finally, 10 mol % $CO_2$ followed by the mixture of 10 mol % $CO_2$ and 0.5 mol % $SO_2$ ($CO_2 \rightarrow CO_2$ & $SO_2$). The difference between ($CO_2 \rightarrow SO_2$) and ($CO_2 \rightarrow CO_2$ & $SO_2$) is that in the former the partial pressure of $CO_2$ changes whereas in the latter it does not. Subsequently the sorbent was exposed to nitrogen in the release step, in the cases without a displacement step a dashed line connects the uptake and release profiles. The loading is reported on a mass rather than molar basis since in the case of mixtures it cannot be known for certain which gas reacted and hence which molecular weight to apply.

Figure 4A:
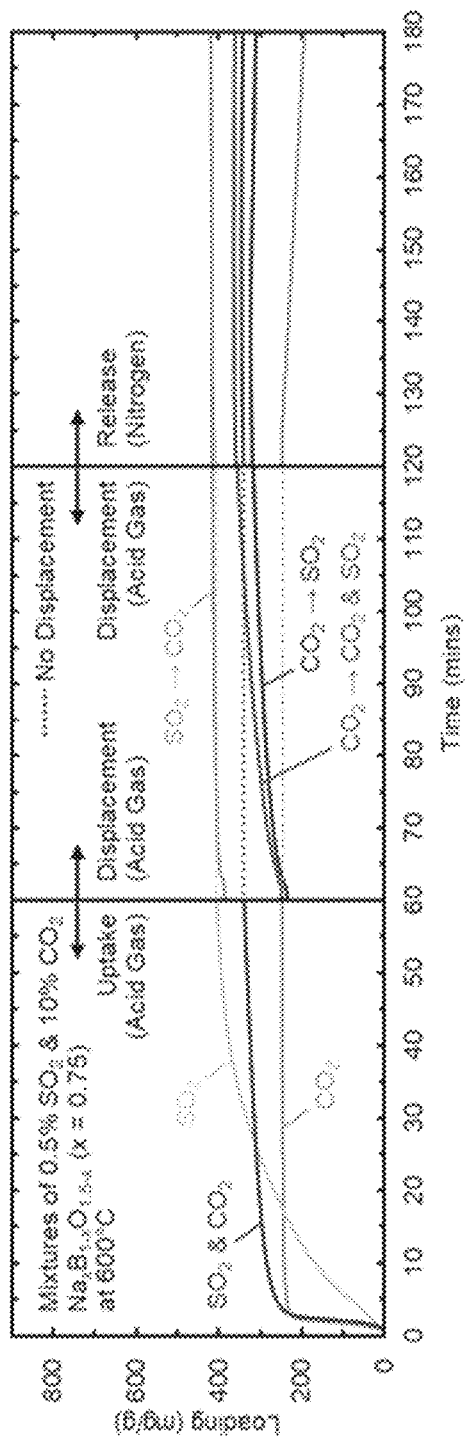
FIGS. 4A-4D show, in accordance with some embodiments, uptake, displacement, and release of acid gas mixtures for $Na_xB_{1-x}O_{1.5-x}$ (x=0.75) at (A) 600° C., and (B) 700° C., and for $(Li_{0.5}Na_{0.5})_xB_{1-x}O_{1.5-x}$ (x=0.75) at (C) 600° C., and (D) 700° C.

For the sorbent $Na_xB_{1-x}O_{1.5-x}$ (x=0.75) at 600° C. (FIG. 4A), $CO_2$ rapidly reacted and reached full capacity within just a few minutes. The concentration of $SO_2$ was 20 times lower so the reaction was slower for $SO_2$ individually, but the loading approached the full capacity seen in FIG. 3A within 60 minutes. For the mixture of both gases the loading closely matched that of $CO_2$ initially but then continued to increase. However the capacity of $SO_2$ individually was not reached with 60 minutes, suggesting that $CO_2$ was being slowly displaced by $SO_2$. The same was true when the sorbent was first loaded with $CO_2$ and then exposed to $SO_2$, and when loaded with $CO_2$ and then exposed to the mixture. These three cases were similar because at 600° C. the change in partial pressure of $CO_2$ does not result in significant release of $CO_2$. Under release conditions at 600° C. desorption was not favorable for either gas. $CO_2$ loading dropped slightly but most other variations resulted in no significant release. Without wishing to be bound by any theory, in the case of $SO_2 \rightarrow CO_2$ the loading remained approximately constant confirming that $SO_2$ reacts irreversibly with the sorbent and cannot be displaced by $CO_2$ in some embodiments.

Figure 4B:
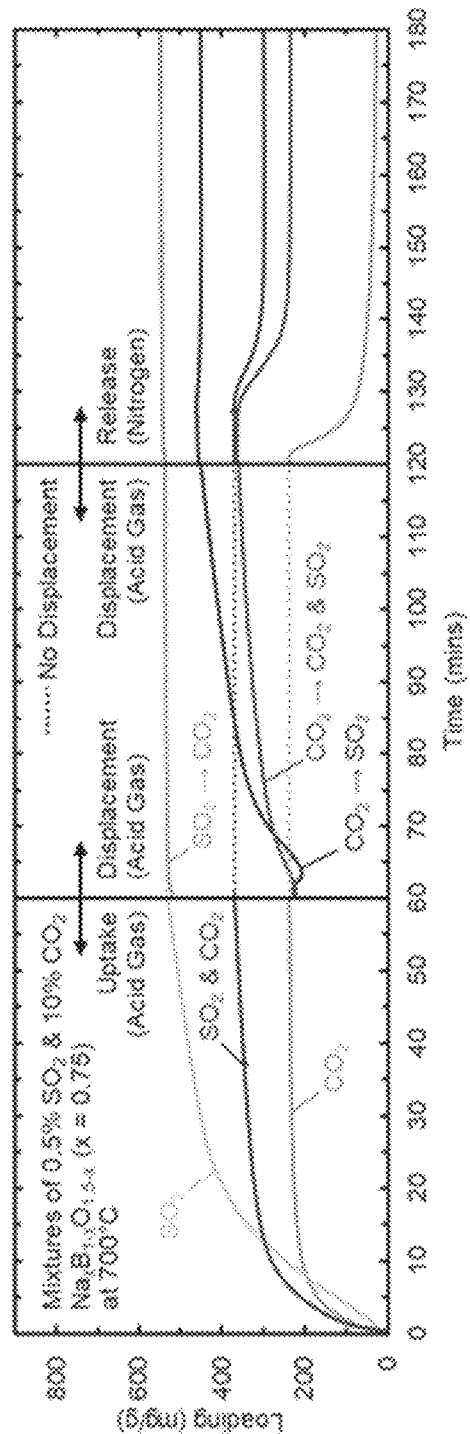

The results at 700° C. differed from those at 600° C. partly because the release of $CO_2$ is favorable at the higher temperature. In FIG. 4B, the mixture of gases first follows the path of $CO_2$ individually then deviates and approaches the capacity of $SO_2$ individually. In the case of $CO_2 \rightarrow SO_2$ a slight drop in loading was seen as $CO_2$ was released before the loading increased with the uptake of $SO_2$. In some cases, the rate of uptake of $SO_2$ is faster for $CO_2 \rightarrow SO_2$ than the cases $SO_2$ & $CO_2$ and $CO_2 \rightarrow CO_2$ & $SO_2$. The presence of $CO_2$ slows the displacement reaction as the carbonate product remains stable. As seen at 600° C. $CO_2$ does not displace $SO_2$ in the $SO_2 \rightarrow CO_2$ variation. Under release conditions $CO_2$ individually was quickly released while $SO_2$ was not released. The change in loading for each variation therefore indicates the relative proportion of $CO_2$ and $SO_2$ captured.

Figure 4C:
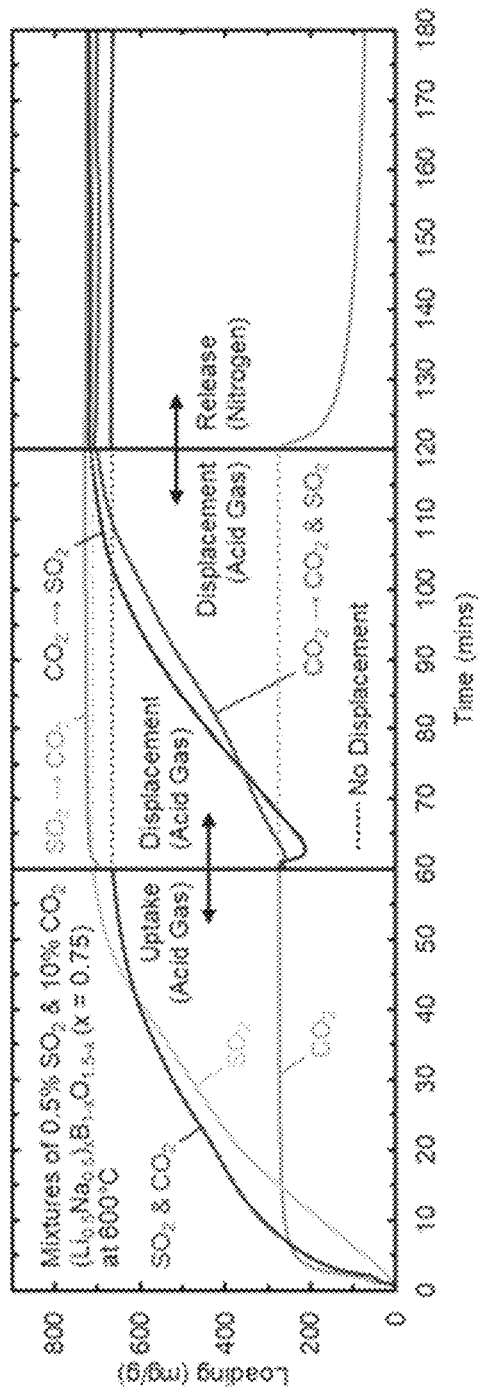
Figure 4D:
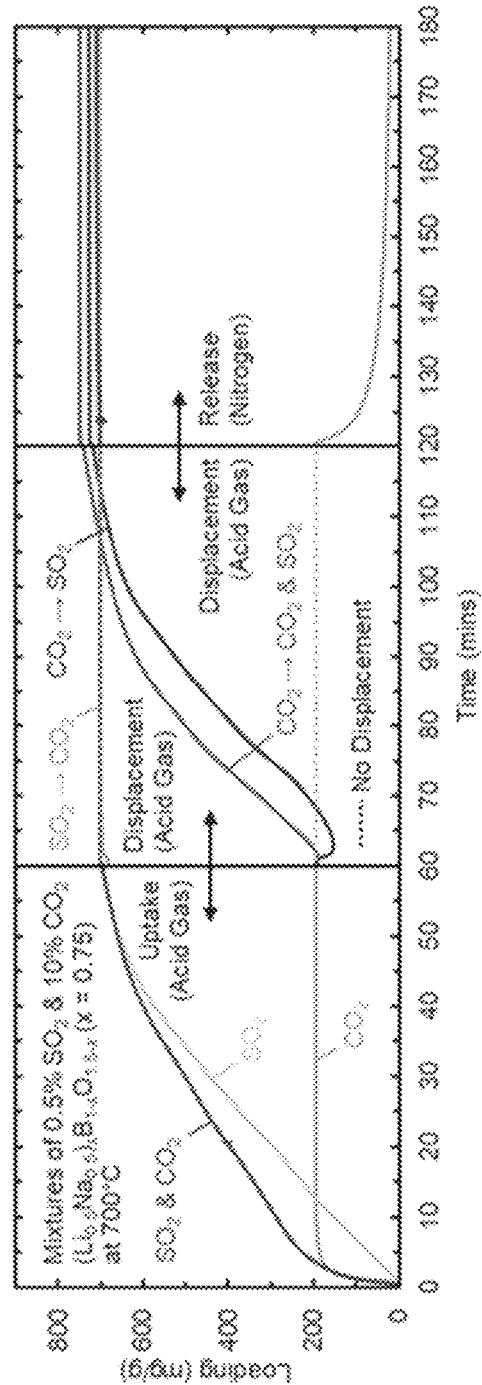

The lithium-sodium borate $(Li_{0.5}Na_{0.5})_xB_{1-x}O_{1.5-x}$ (x=0.75) differed from the sodium borate in that the capacity was greater, the $CO_2$ reaction was reversible at at least some temperatures, and the reaction products were liquids. At 600° C., FIG. 4C, the mixture first tracks the loading of $CO_2$ individually but then quickly displaces this $CO_2$ with $SO_2$ and tracks the loading of $SO_2$ individually. Without wishing to be bound by any theory, it is believed that the carbonate ion stabilized in the melt through coordination with free lithium and sodium ions and were more easily displaced than the solid sodium carbonate crystals in the case of the sodium borate. Therefore, each variation the capacity reached that of $SO_2$ individually regardless of the presence of $CO_2$ or original loading. The complete displacement of $CO_2$ by $SO_2$ was supported by the release profiles in which show the release of $CO_2$ individually but no release for any other variant. Without wishing to be bound by theory, it is believed that at 700° C. (FIG. 4D), the capacity for $CO_2$ decreased due to more favorable release conditions but otherwise the profiles for each variation are similar to those at 600° C.

Oxides of Sulfur, $SO_x$

FIG. 3A suggests that for $Na_xB_{1-x}O_{1.5-x}$ (x=0.75) at 600° C. the reaction proceeded in a similar manner for both $SO_2$ and $CO_2$. It is known that for $CO_2$ the general reaction proceeds with conversion to sodium metaborate ($NaBO_2$, x=0.50) and sodium carbonate ($Na_2CO_3$), $$\left(\frac{1}{x-0.5}\right)Na_xB_{1-x}O_{1.5-x} + CO_2 \rightarrow$$
$$\left(\frac{1-x}{x-0.5}\right)NaBO_2 + Na_2CO_3,$$
where $0.50 < x < 1$ Equation 1

For the case where this initial composition of the sodium borate is x=0.75 the stoichiometry of the reaction with conversion to x=0.50 can be written as, $$Na_3BO_3 + CO_2 \rightarrow NaBO_2 + Na_2CO_3$$

Equation 2

The similarity between the uptake profiles at 600° C. implies the $SO_2$ reaction is analogous, $$Na_3BO_3 + SO_2 \rightarrow NaBO_2 + Na_2SO_3$$

Equation 3

Figure 5A:
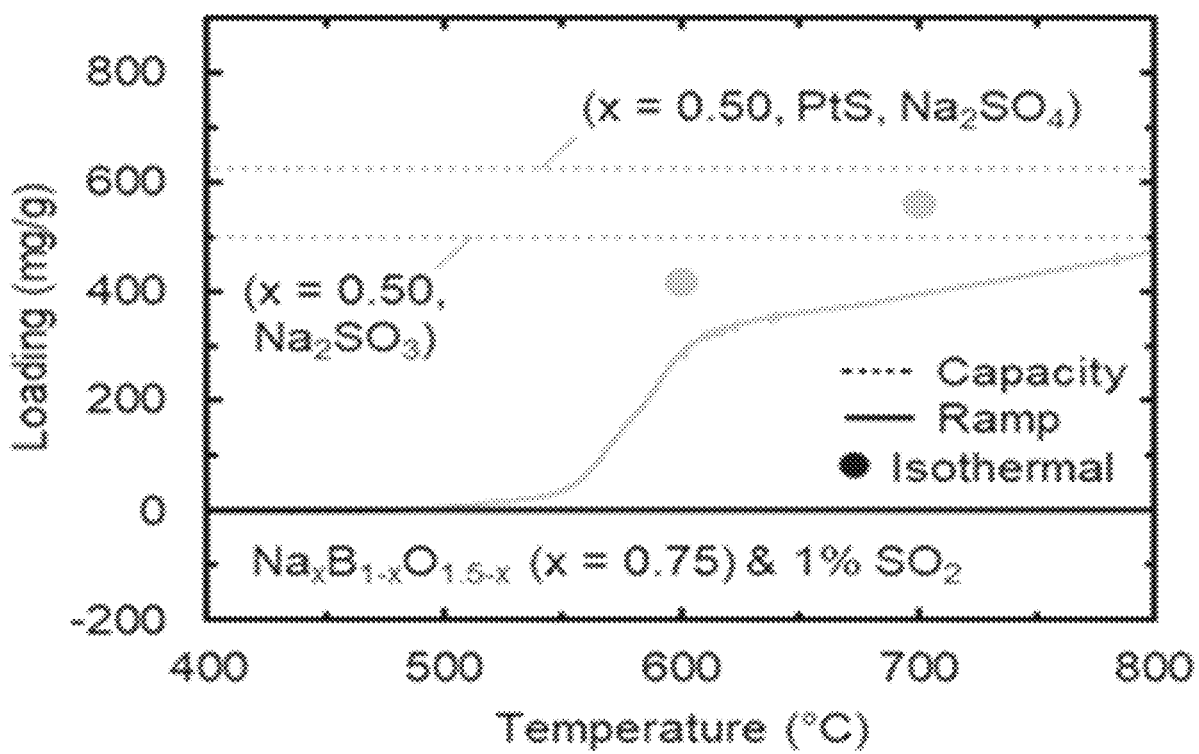
FIGS. 5A-5D show, in accordance with some embodiments, for $Na_xB_{1-x}O_{1.5-x}$ (x=0.75) (A) $SO_2$ capacity under 5° C./min temperature ramp, isothermal uptake, and predicted by Equations 3 & 4 (B) XRD at 25° C. after reaction with $SO_2$ at 600° C. and 700° C., for $(Li_{0.5}Na_{0.5})_xB_{1-x}O_{1.5-x}$ (x=0.75) (C) $SO_2$ capacity under 5° C./min temperature ramp, isothermal uptake, and predicted by (analogous) Equations 3 & 4, and (D) XRD after reaction with $SO_2$ at 25° C., 600° C., and 700° C.

Assuming this is true, the complete reaction should correspond to a capacity of 501 mg/g. FIG. 5A, shows the loading as a function of temperature for $Na_xB_{1-x}O_{1.5-x}$ (x=0.75) under 1 mol % $SO_2$ with a gradual temperature ramp of 5° C./min. In addition the capacity under isothermal uptake conditions from FIG. 3, above, is represented by dots and the dashed lines show the theoretical capacity for a given reaction, for example (x=0.50, $Na_2SO_3$) corresponds to Equation 3, where the borate reacts to x=0.50 ($NaBO_2$) and the sulfurous product $Na_2SO_3$. The difference between the temperature ramp and the isothermal capacity is due to relatively slow kinetics under 1 mol % $SO_2$.

FIG. 5A, shows the capacity at 600° C. was slightly below but close to that predicted by Equation 3 supporting the view that this is the primary reaction mechanism. In addition, XRD analysis, FIG. 5B, revealed the dominant peaks corresponded to sodium metaborate ($NaBO_2$) and sodium sulfite ($Na_2SO_3$). However, at 700° C. the isothermal capacity exceeded this capacity which cannot be explained by Equation 3. Without wishing to be bound by any theory, a possibility is the occurrence of the following decomposition reaction which has been known to occur at around 700° C., $$4Na_2SO_3 \rightarrow 3Na_2SO_4 + Na_2S$$

Equation 4

Figure 5B:
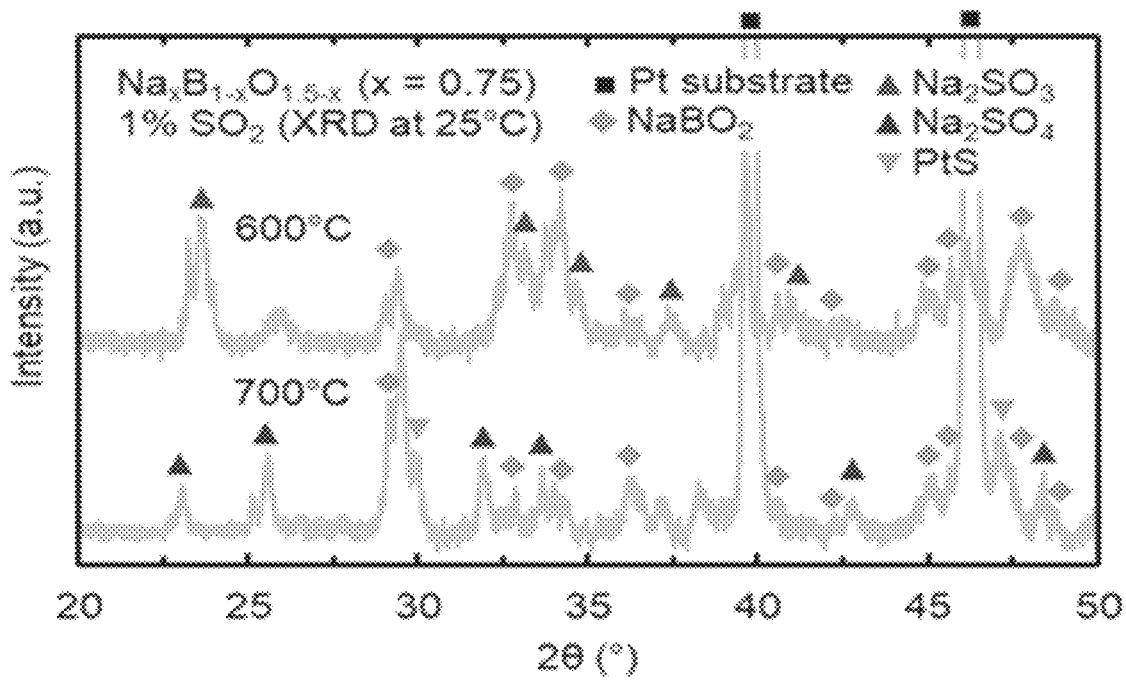

Equation 4 explains the observation of sodium sulfate ($Na_2SO_4$) rather than sodium sulfite ($Na_2SO_3$) by XRD after reaction at 700° C., FIG. 5B. To explain the increased capacity, without wishing to be bound by any theory, consider that sodium sulfide, $Na_2S$, may have reacted further with $SO_2$ with the involvement of platinum, from the platinum pan or platinum substrate, to generate platinum sulfide (PtS) and more sodium sulfate ($Na_2SO_4$), $$Na_2S + 2SO_2 + 2Pt \rightarrow 2PtS + Na_2SO_4$$

Equation 4B

Without wishing to be bound by any theory, this reaction could raise the capacity to ~630 mg/g and provide an explanation for the slower second increase in loading observed in the uptake experiments, FIG. 3B, furthermore platinum sulfide peaks observed by XRD after reaction at 700° C., FIG. 5B.

Figure 5C:
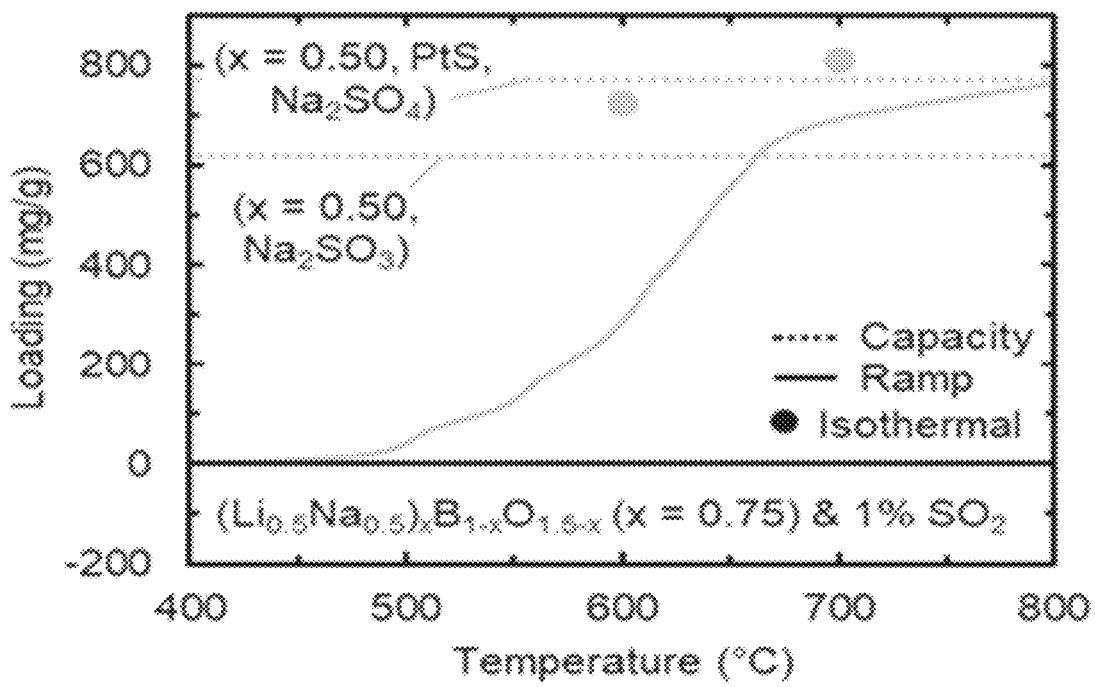

Without wishing to be bound by any theory, similar reactions might also explain the performance of the lithium-sodium borate, FIG. 5C. However, at 600° C. the capacity exceeded that predicted by the equivalent of Equation 3 suggesting that at both temperatures considered the equivalent of Equation 4 played an important role. Without wishing to be bound by any theory, the observation of capacity even greater than predicted by Equation 4 for the lithium-sodium borate under isothermal uptake at 700° C. could be due to the formation of poly-sulfides or the conversion of lithium borate to compositions less than x=0.50, for example x=0.25 ($Li_2B_4O_7$), which has been proposed as a possible product of the reaction between tri-lithium borate ($Li_3BO_3$) and $CO_2$.

Figure 5D:
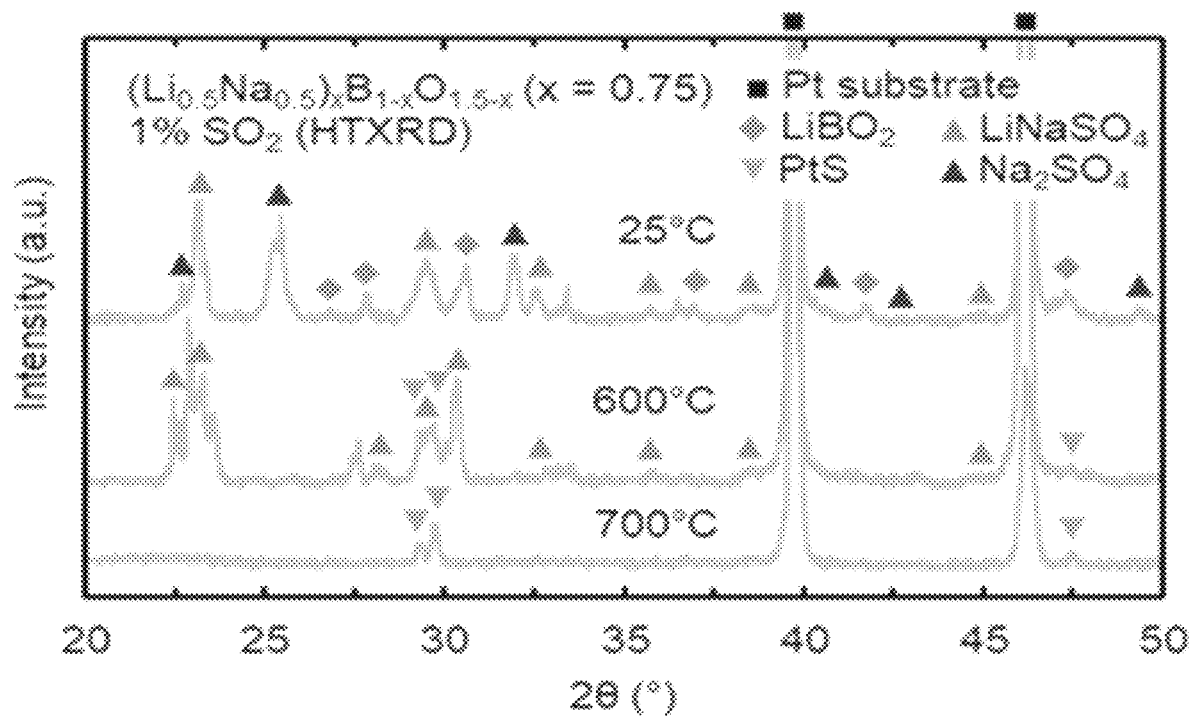

XRD at 25° C. after reaction at 600° C., FIG. 5D, supports the reaction to sulfate products with peaks corresponding to sodium sulfate ($Na_2SO_4$), lithium-sodium sulfate (LiNaSO_4), and lithium metaborate ($LiBO_2$). The expected instability of lithium sulfite ($Li_2SO_3$), and the absence of any sodium borate peaks suggest that sodium is the dominant alkali metal in the reaction with $SO_x$. Without wishing to be bound by theory, it is thought that Equation 3 and Equation 4 both occur as written with sodium taking part in the reactions. Subsequently sodium sulfate forms and some of the lithium present in the melt coordinates with the sulfate to form lithium-sodium sulfate.

Sodium sulfate melts at ~880° C., which suggested for $Na_xB_{1-x}O_{1.5-x}$ (x=0.75) the $SO_2$ reaction mechanism is similar to $CO_2$, in that the gas reacted with the liquid sorbent to form solid precipitants. However, for the lithium-sodium borate, in some embodiments, this may not be the case. With $CO_2$ the lithium-sodium borate, $(Li_{0.5}Na_{0.5})_xB_{1-x}O_{1.5-x}$ (x=0.75), forms a eutectic such that both the borate and the carbonate products are in the liquid phase above ~500° C. In the case of $SO_2$ HTXRD showed that at 600° C. no peaks corresponding to an alkali metal borate were present, suggesting these species exists in the liquid phase. Only the lithium-sodium sulfate (LiNaSO_4) phase remained a solid crystal at ~600° C., but at 700° C. this compound was also brought into the melt such that all reaction products with $SO_2$, with the exception of platinum sulfide, were liquids at 700° C., similar to the case with $CO_2$.

The reactions and mechanisms proposed in this example may have important ramifications on the design of high-temperature carbon capture facilities and will be discussed further below. However, a discussion is included here of two expected phenomena of interest in the oxidizing environment of real exhausts containing $SO_x$. First, without wishing to be bound by theory, sodium sulfide is unlikely to be stable in the presence of an oxidizing agent, for example, $$Na_2S + 2O_2 \rightarrow 4Na_2SO_4$$

Equation 5

Hence, corrosion of the reactor vessel by sulfurization may be less likely than implied by the formation of transition metal sulfide in the above examples. And second, at high temperatures $SO_2$ may react with oxidizing agents to $SO_3$, which the latter typically comprises 0.1 to 3 mol %, $$SO_2 + \frac{1}{2}O_2 < > SO_3$$

Equation 6

Although not studied explicitly mentioned in this example, sulfur trioxide ($SO_3$) is contemplated to be efficiently captured by a more direct reaction with the molten alkali metal borates ($A_3BO_3$) to form sulfates, ($A_2SO_4$) bypassing the formation of sulfites ($A_2SO_3$) and sulfides ($A_2S$), $$A_3BO_3 + SO_3 \rightarrow ABO_2 + A_2SO_4$$

Equation 7

Hydrogen Sulfide, $H_2S$

Figure 6A:
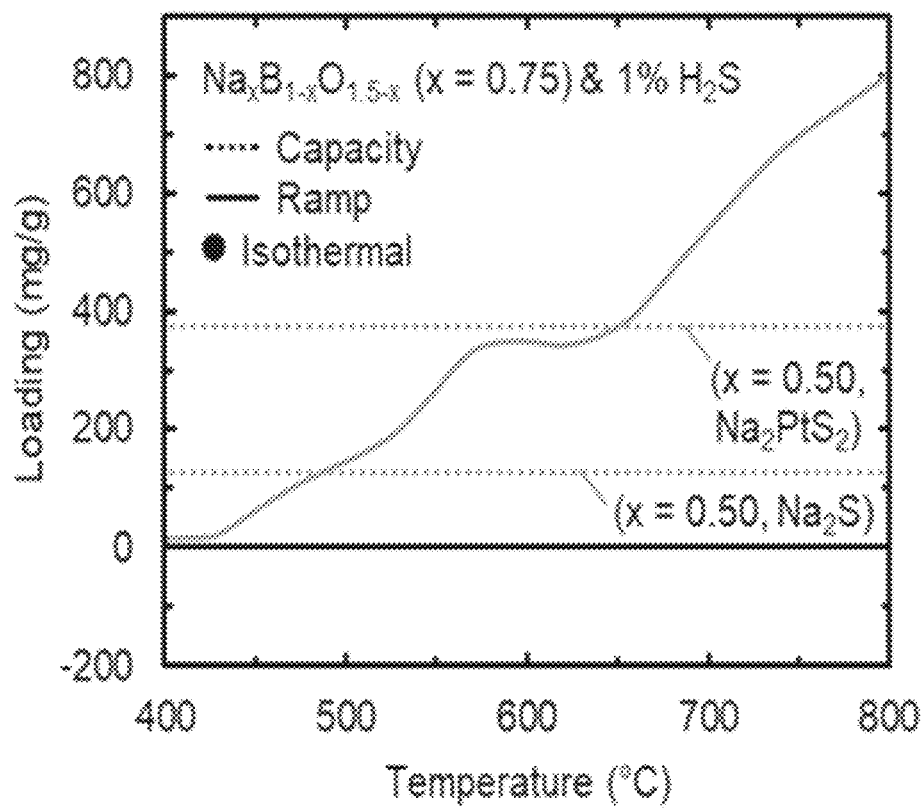
FIGS. 6A-6B show, in accordance with some embodiments, (A) $H_2S$ capacity for $Na_xB_{1-x}O_{1.5-x}$ (x=0.75) under 5° C./min temperature ramp, and predicted by Equations 8 & 9 (B) XRD at 25° C. after reaction with $H_2S$ at 600° C. for $Na_xB_{1-x}O_{1.5-x}$ (x=0.75) and $(Li_{0.5}Na_{0.5})_zB_{1-x}O_{1.5-x}$ (x=0.75).

Hydrogen sulfide presents an interesting parallel to the oxides of sulfur. As with $SO_x$ the interaction between the basic sorbent and the acidic gas was strong, which may result in the efficient removal of the gas. FIG. 6A shows the weight change of the sodium borate $Na_xB_{1-x}O_{1.5-x}$ (x=0.75) under a temperature ramp of 5° C./min and 1 mol % $H_2S$. Note that, in some cases, limited experiments were carried out with $H_2S$ due to its propensity to damage the instrumentation used in the uptake experiments. However, the results for the sodium borate may be sufficient to give some useful insight into the reaction mechanism.

Unlike with $CO_2$ and $SO_2$, the reaction with $H_2S$ began at ~430° C. much lower than the melting point of the sorbent (~570° C.). Between 550° C. and 650° C. the loading plateaus around 350 mg/g before increasing further as the temperature was increased. The typical reaction between metal oxides and $H_2S$ involves the formation of metal sulfides and water/steam, for example, $$Na_3BO_3 + H_2S \rightarrow NaBO_2 + Na_2S + H_2O \quad \text{Equation 8}$$

Figure 6B:
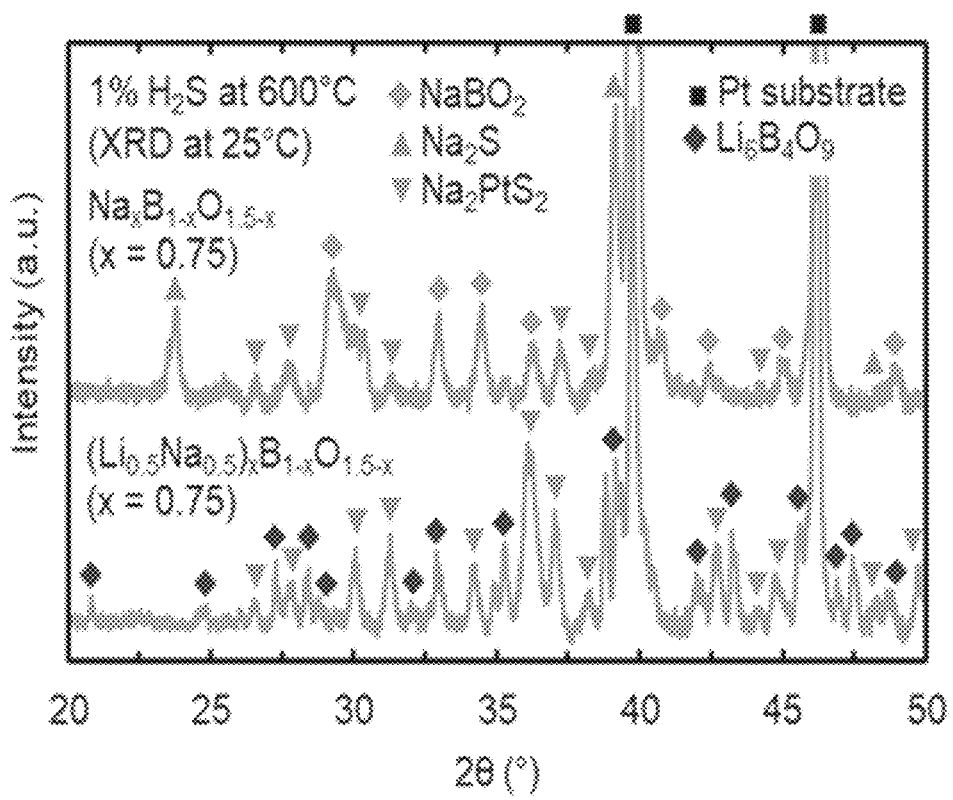

Without wishing to be bound by any theory, the theoretical capacity of this reaction is only 126 mg/g, which was quickly surpassed in the uptake experiment, but even complete conversion to x=0, with reaction products $Na_2S$ and $B_2O_3$, would only give a theoretical capacity of 283 mg/g. However, the formation of poly-sulfides or sodium platinum sulfide ($Na_2PtS_2$) with conversion of the alkali metal borate to x=0.50 may explain the loading in the range 550° C. to 650° C., for example, $$Na_3BO_3 + 2H_2S \rightarrow Na_2PtS_2 + H_2O + H_2 + NaBO_2 \quad \text{Equation 9}$$

which was supported by XRD, FIG. 6B, revealing peaks that after reaction at 600° C. can ascribed to $Na_2S$, $NaBO_2$, and $Na_2PtS_2$. In certain embodiments above 650° C., the reaction may proceed to a conversion less than x=0.50, at the extreme x=0, which would give a theoretical capacity of ~1700 mg/g. In some cases, no uptake experiments were carried out with the lithium-sodium borate $(Li_{0.5}Na_{0.5})_xB_{1-x}O_{1.5-x}$ (x=0.75); however, XRD revealed a reaction similar to Equation 9 is likely with products including $Na_2PtS_2$ and $Li_6B_4O_9$.

Oxides of Nitrogen, $NO_x$ The oxides of nitrogen present a complex and challenging case to study. Firstly, gas phase chemistry plays an especially important role as at the high temperatures of interest $NO_2$ decomposes by the equilibrium reaction, $$NO_2 \leftrightarrow NO + \tfrac{1}{2}O_2 \quad \text{Equation 10}$$

resulting in a mixture that is only 5 to 10 mol % $NO_2$ at capture conditions. Secondly, the expected nitrate and nitrite products bring complexity in the multiple consecutive and reversible reactions that may occur. Thirdly, as with $H_2S$, in some embodiments, limited experiments could be carried out with $NO_x$ due to damage inflicted on equipment. Despite these challenges, meaningful conclusions can be drawn from the interaction between the molten alkali metal borates and $NO_x$ emitted from high temperature sources.

Figure 7A:
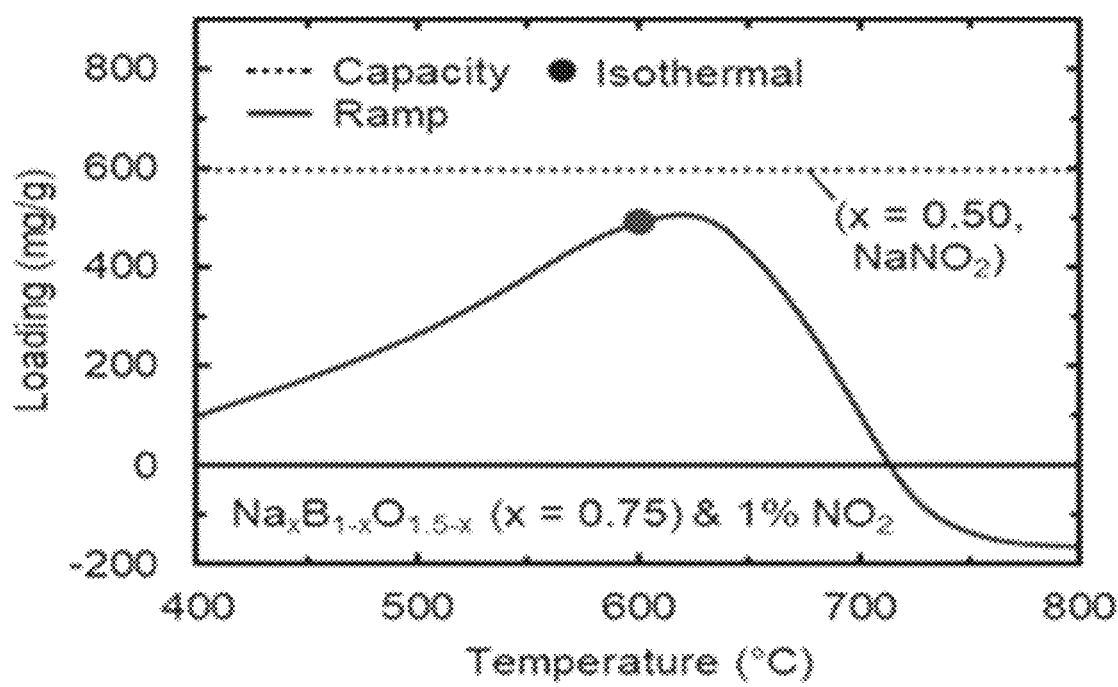
FIGS. 7A-7D show, in accordance with some embodiments, (A) $NO_2$ capacity for $Na_xB_{1-x}O_{1.5-x}$ (x=0.75) under 5° C./min temperature ramp, (B) XRD at 25° C. after reaction with $NO_2$ at 600° C. and 800° C. for $Na_xB_{1-x}O_{1.5-x}$ (x=0.75), (C) Isothermal uptake and release at 600° C. for $Na_xB_{1-x}O_{1.5-x}$ (x=0.75), and (D) $(Li_{0.5}Na_{0.5})_xB_{1-x}O_{1.5-x}$ (x=0.75) under 5° C./min temperature ramp.

FIG. 7A shows the weight change of the sodium borate $Na_xB_{1-x}O_{1.5-x}$ (x=0.75) under a temperature ramp of 5° C./min and 1 mol % $NO_2$. Uptake began as low as 300° C. and reached a peak at 600° C. before release becomes favorable and the loading decreases, at ~700° C. a negative loading was observed, indicating a loss of mass from the original sodium borate. Without wishing to be bound by any theory, sodium nitrate and nitrite are liquids above ~300° C., and may catalyze their own reaction by providing a liquid surface capable of reacting rapidly with the solid sodium borate at temperatures much lower than its melting point, as is the case in molten nitrate promoted $CO_2$ capture using metal oxides. Decomposition and vaporization of the nitrates and nitrates is known to occur simultaneously at temperatures above 600° C., which could explain the loss of mass above ~700° C. Based on theoretical capacity, the reaction with $NO_x$ appears to have the stoichiometry close to, $$Na_3BO_3 + NO_2 + NO \rightarrow NaBO_2 + 2NaNO_2 \quad \text{Equation 11}$$

though it is recognized that in practice it is likely a large number of gas and liquid phase reactions lead to the net reaction given by Equation 11.

Figure 7B:
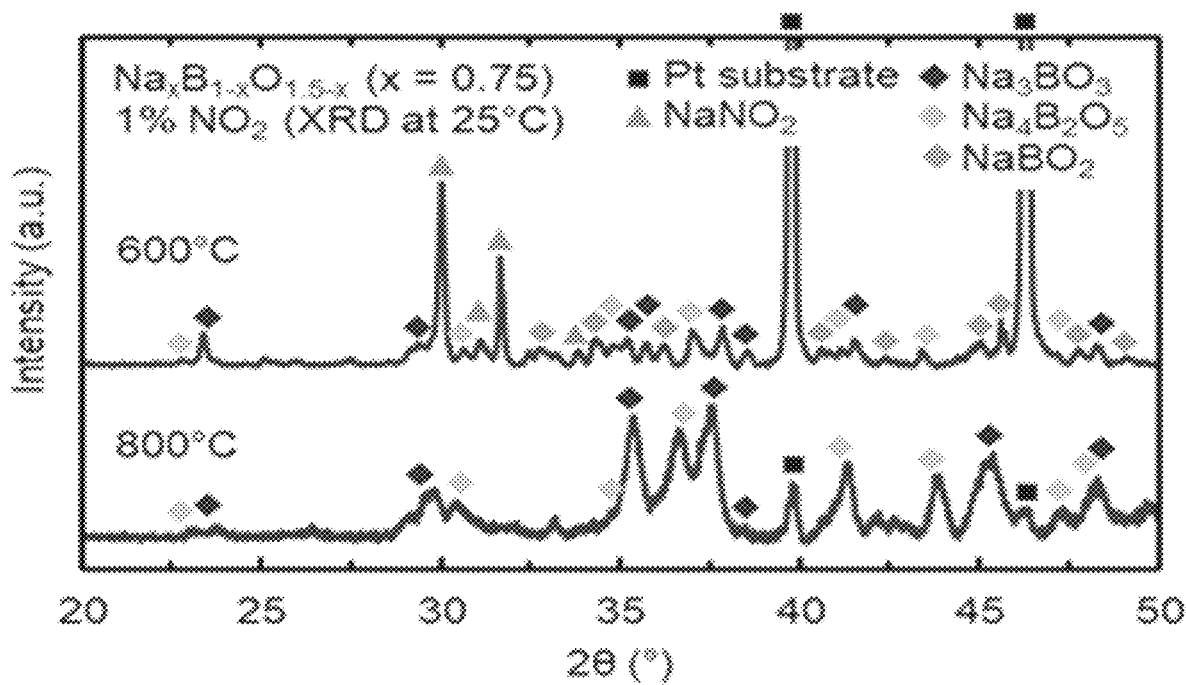

The observation of peaks corresponding to sodium nitrite ($NaNO_2$) and sodium metaborate ($NaBO_2$) after exposure to $NO_2$ at 600° C., FIG. 7B, supported this net reaction for certain embodiments. However, in some embodiments, unreacted tri-sodium borate (x=0.75), and partially reacted di-sodium borate (x=0.66) were also observed indicating that the reaction did not proceed to the same extent in the tube furnace. After reaction at 800° C., the peaks ascribed to sodium nitrite ($NaNO_2$) were no longer present leaving a mixture of tri-sodium borate ($Na_3BO_3$) and di-sodium borate ($Na_4B_2O_5$). Decomposition to $Na_4B_2O_5$ has a theoretical mass loss of 243 mg/g, therefore the mixture of $Na_3BO_3$ and $Na_4B_2O_5$, which may explain the observed loss of ~150 mg/g. The decomposition of sodium nitrite involves a number of reactions including the evolution of gaseous $N_2$, $O_2$, and NO, and solid $Na_2O$, which would recombine with the borate melt, in addition to vaporization.

Figure 7C:
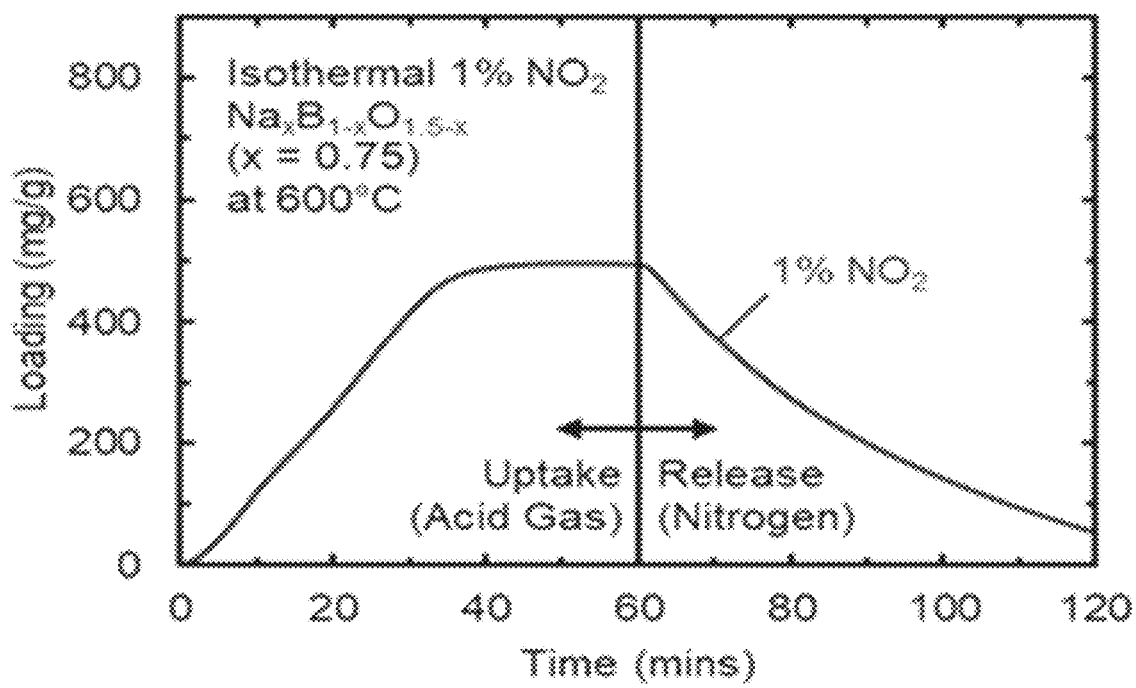
Figure 7D:
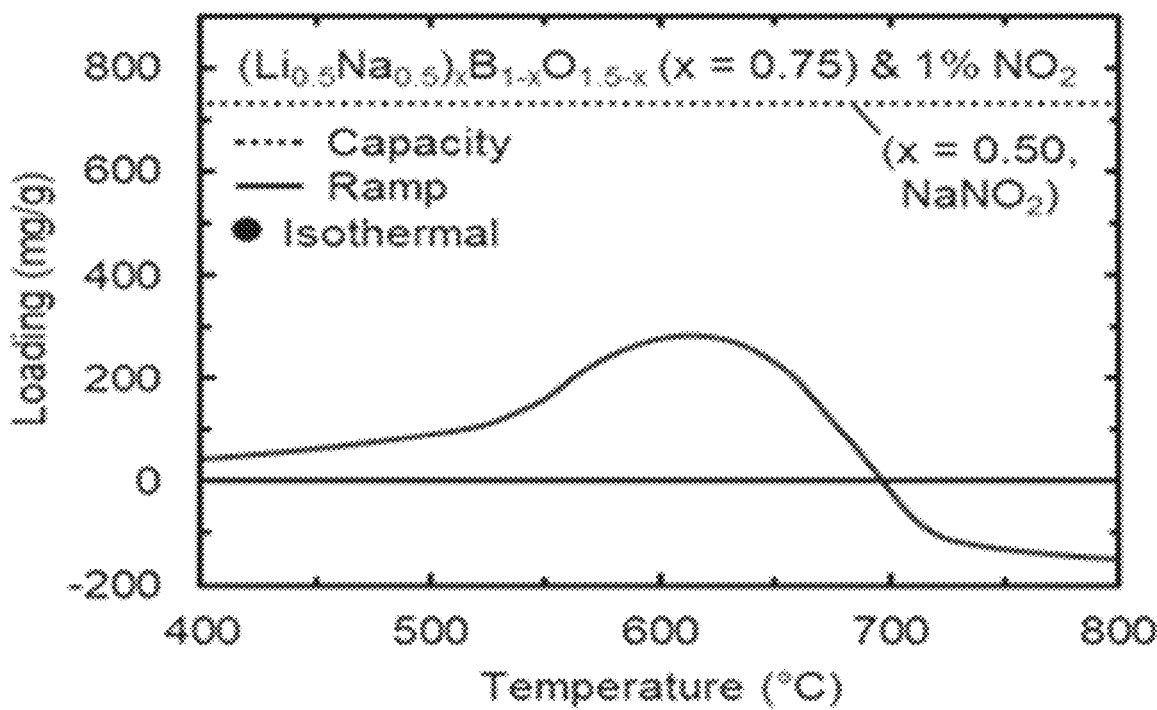

Isothermal uptake and release were demonstrated for some embodiments in FIG. 7C at 600° C. without the mass loss associated with higher temperatures. As with other acid gases the behavior of lithium-sodium borate was similar to sodium borate, as demonstrated by the temperature ramp in FIG. 7D. The maximum loading was lower, and the reaction did not go to completion, but significant uptake was observed even at 1 mol % $NO_2$. Without wishing to be bound by any theory, as with sulfates/sulfites, the lithium nitrates/nitrates were less stable than their sodium counterparts making it likely that sodium was the dominant alkali metal involved in the above reactions, with lithium preferentially interacting with the borate species.

The understating developed above may influence the design of high-temperature carbon capture systems. The strong interaction between the molten alkali metal borates and the acid gases demonstrate that a sorber designed for carbon capture may capture not just $CO_2$ but any other acid gases (e.g., non-$CO_2$ acid gases) present. This could represent an opportunity to capture multiple acid gases in a single sorber, or a challenge to manage various corrosive or hard-to-handle reaction products. The distinction between opportunity and challenge lies in design, which will be the topic of this section of the Example.

Figure 8:
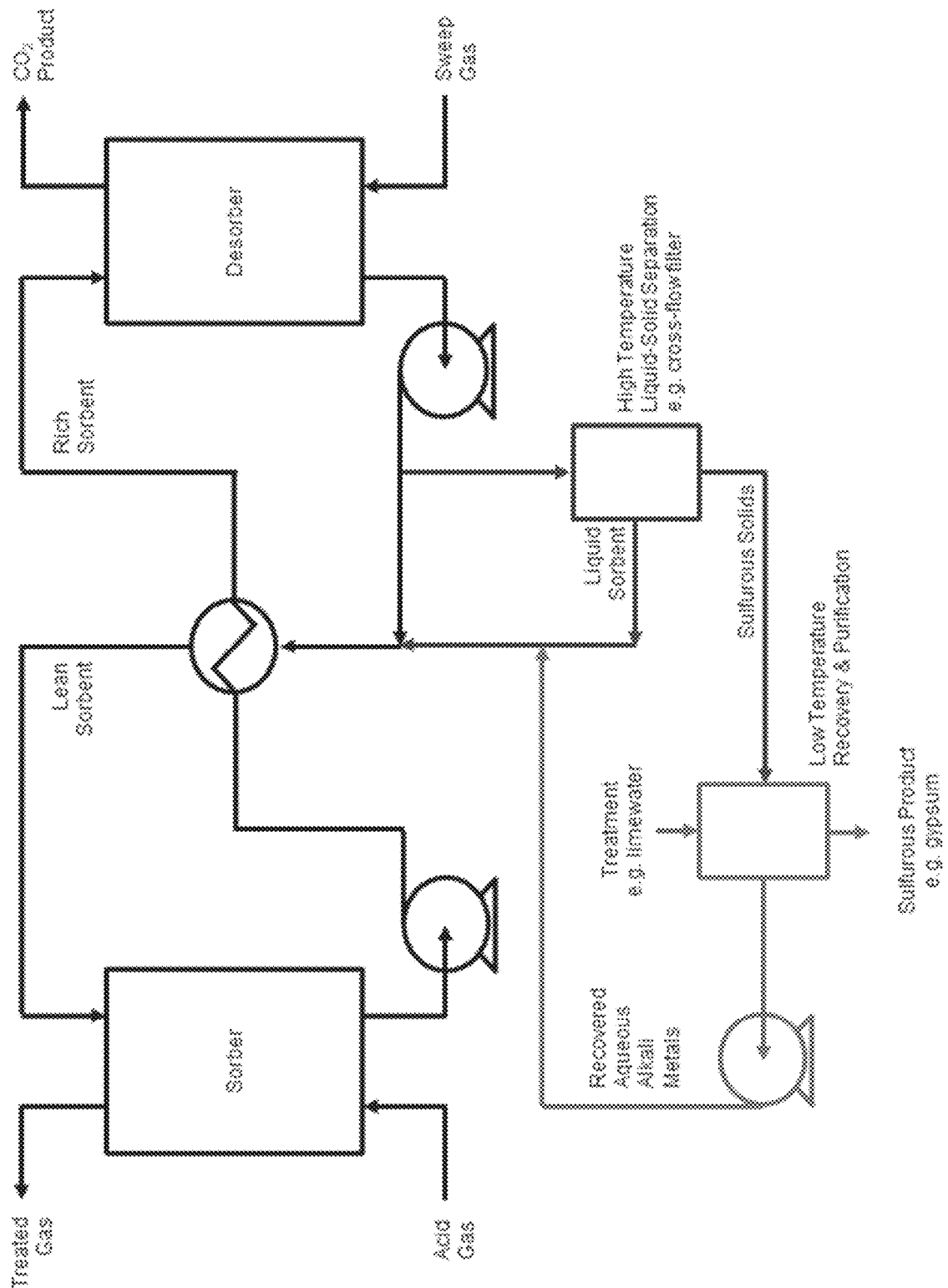
FIG. 8 shows a design of a carbon capture system using molten alkali metal borates without consideration for other acid gases separation of sulfurous species at high temperature recovery and purification at ambient temperatures, according to certain embodiments.

One of the principal advantages of the molten alkali metal borates is their fluidic nature, which may provide easy transfer between sorber and desorber at high temperatures, as depicted in FIG. 8, for some embodiments. Without modification, considering the plots in FIG. 8, two outcomes may be possible after capture of acid gases other than $CO_2$, either their release into the $CO_2$ product stream in the desorber, or their accumulation in the system until the sorbent needs to be replaced. Note that $CO_2$ is in excess in the sorber resulting in a relatively low loading of other acid gases. Therefore, without wishing to be bound by any theory, it is not expected that their presence will significantly interfere with the pumping or fluidity of the bulk sorbent, unless they accumulate.

In many cases, the reaction with $SO_x$ is irreversible at reasonable temperatures; however, the reaction with $NO_x$ was easily reversed upon pressure-swing. Therefore, sulfurous products will be retained after the desorption step while products of the $NO_x$ reaction will be released into the $CO_2$ product stream. Gaseous release from $NO_x$ products at less than 700° C. comprise $N_2$, $O_2$, and NO, which may be acceptable in the product stream in small quantities. To reduce the vaporization of nitrates/nitrites and hence loss of alkali metal from the system, it was desirable to maintain desorption temperatures less than 700° C. The loss of alkali metal from the system may slightly reduce the mixing ratio, x, of the molten alkali metal borate circulating between sorber and desorber. However, the mixing ratio could be raised by alkali metal hydroxide/carbonate addition. If loses are small and predominantly sodium rather than lithium, which is expected, this approach can be both simple and cost effective.

A different strategy may be useful to handle sulfurous products as these may build-up in the system. One option would be to include a purge stream and continually replenish the sorbent. However, the nature of the molten alkali metal borates could allow for not only the simultaneous capture of multiple acid gases but also their efficient separation. Since the molten alkali metal borates are liquids and the sulfurous products are typically solids any number of liquid-solid separation techniques could be applied to a slip stream of the circulating sorbent, which would separate out the sulfurous compounds at high temperatures, as schematically depicted in FIG. 8.

As the density difference between the melt and the sulfurous products is relatively small, filtration may outperform gravitational methods of separation. For example, cross-flow filtration with a metal mesh separator applied to a slip stream downstream of the desorber pump may be a suitably simple and robust method at the high temperatures involved. A large mesh size would reduce pressure drop and allow for a modest amount of solids recirculation. Once upconcentrated, the sulfurous compounds could be further refined and purified under ambient conditions and made into marketable products. Several options exist including some at high temperatures which would minimize thermal loses. However, it is likely that the value of lithium relative to all other species will dictate the treatment method. One option would be to contact the concentrated sulfate stream with limewater, ($Ca(OH)_2$(aq)), as schematically illustrated in FIG. 8. Without wishing to be bound by any theory, in the aqueous phase at ambient temperatures the sulfurous species would precipitate calcium sulfate ($CaSO_4$), for example,

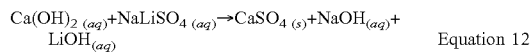

$$Ca(OH)_{2\ (aq)} + NaLiSO_{4\ (aq)} \rightarrow CaSO_{4\ (s)} + NaOH_{(aq)} + LiOH_{(aq)} \qquad \text{Equation 12}$$

The resultant gypsum ($CaSO_4.2H_2O$) could be sold as is common practice in the industry today, and the remaining ions in solution, which may include some borate species but more importantly valuable lithium ions, could be returned to the high temperature system. Evaporation of the water required for dissolution would leave predominantly alkali metal hydroxides which would return the sorbent to its original mixing ratio, x.

Assuming the reactor vessel can be protected from sulfurization, a similar process to that described for $SO_x$ may be appropriate for simultaneous $H_2S$ capture and separation. Solid $Na_2S$ may be filtered and treated. As with sulfates, treatment would depend on the desired sulfurous product, but to ensure recovery of the alkali metal and borate species the reaction with oxygen to generate sulfates for subsequent treatment may be preferable. In the case of a reducing environment comprising no oxidizing agent will be present to protect the reactor vessel from sulfuization, as was the case in the oxidizing environment. In existing facilities that handle $H_2S$, particularly at high temperatures, sulfurization remains a major problem. Indeed, this is the primary motivation for pre-treatment in refineries and gas-sweetening facilities. Sulfurization can be subdued by material selection and the formation of a thin protective metal-sulfide layer. This and other corrosion prevention techniques could allow for the removal of $H_2S$ by the molten alkali metal borates without undesirable reaction with the metals present in the sorber vessel walls or packing. Having said this, it is contemplated that upstream desulfurization, for example natural gas sweetening, will remain important to future carbon capture facilities operating under a reducing environment.

Comparison with Others

The conceptual designs described elsewhere herein may resemble some of the existing strategies in use for amine and calcium looping systems which, in some cases, represent the state-of-the-art in low and high temperature carbon capture, respectively. However, the molten alkali metal borates present a number of advantages in the context of dealing with acid gas impurities, which are briefly described below.

In certain embodiments, $SO_x$ react with amines to form dissolved sulfites/sulfates in the aqueous phase; however, the inability to upconcentrate these species requires that a large proportion of the recirculating amine solution be regularly purged for treatment. A number of options exist, with thermal reclamation, amines evaporation and recovery, being the most established. However, this approach is usually only cost effective with upstream flue gas desulfurization, since thermal reclamation results in amine losses, and presents a relatively large energy penalty and contaminates the semi-solid product.

In some embodiments, $NO_x$ also react with amines, forming dissolved nitrites/nitrates and nitrosamines/nitramines. Depending on the amine this absorption can result in modest removal of $NO_x$ to near complete removal. While these reactions may provide some benefit in $NO_x$ reduction the net effect is generally negative due to the health risks associated with some nitrosamines, which will be present in the solid product, and the relatively high cost of amines. As mentioned elsewhere herein, amines may be well suited to $H_2S$ capture, in some cases, but not for high-temperature applications as described herein, such as pre-combustion carbon capture and hydrogen production. For appropriate comparison with a high-temperature sorbent, we consider calcium oxide and the calcium looping process.

Calcium oxide may also remove $SO_x$ from the exhaust stream. However, in calcium looping, CaO, $CaCO_3$ and $CaSO_4$ are all solids and cannot be easily separated, requiring the regular purging in of the system. The situation is worsened by calcium sulfates propensity to block internal pores in the solid sorbent, reducing its capacity for $CO_2$. Calcium compounds pervasiveness and low cost partly make up for this shortcoming but the outcome is not ideal. In reducing environments, calcium oxide reacts with hydrogen sulfide ($H_2S$) to form calcium sulfide (CaS), which is also purged as the sorbent degrades. Without wishing to be bound by any theory, although calcium oxide has no propensity to react with $NO_x$, the use of oxy-combustion to generate a large portion of the plants power results in marginally lower $NO_x$ emissions when compared to a reference power plant. However, these emissions would still be unacceptably high and downstream $NO_x$ scrubbing would be required.

CONCLUSIONS

The interaction between the various acid gases (e.g., non-$CO_2$ acid gases) present and the sorbent designed for carbon capture is a key challenge for the state-of-the-art of carbon capture, and a major stumbling block for less mature technologies. In this example and elsewhere herein, it has been demonstrated that the molten alkali metal borates may largely overcome this pitfall and do so in a way that may outperform both amines and calcium looping. This is not to say that challenges do not exist. The importance of material selection, specifically the requirement that vessels and lines containing sulfides be resistant to attack by sulfurization has been demonstrated. It is noted that excess oxygen is desirable in this regard as it will help to suppress the reaction pathway to sulfide formation, as such high-temperature reducing environments rich in $H_2S$ should be minimized, in some cases, with upstream treatment as is common practice in industry today, for example natural gas sweetening. It is also noted that temperatures be limited to ~700° C. to minimize vaporization of nitrate/nitrite species in some cases involving non-acid gas $H_2S$.

However, the net outcome leans heavily towards opportunity. The strongly basic nature of the molten alkali metal borates mean that acid gases can be removed at the low concentrations and mixtures relevant to real systems. The fluidic nature of the molten alkali metal borates allows for designs that take advantage of the typically solid sulfurous products for their efficient separation at high temperatures. When compared to the options available to amines and calcium looping the, designs proposed for the molten alkali metal borates appear superior, bolstering the advantages already afforded to this new class of sorbent for carbon capture. Indeed the molten alkali metal borates and associated system designs and mehtods may prove sufficiently efficient to generalize carbon capture to the broader challenge of acid gas capture.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
exposing a sorbent, the sorbent comprising a salt in molten form, to an environment containing a non-$CO_2$ acid gas such that at least a portion of the non-$CO_2$ acid gas interacts with the sorbent and at least a portion of the non-$CO_2$ acid gas is removed from the environment,
wherein the salt in molten form comprises an alkali metal, boron, and oxygen.

2. The method of claim 1, wherein the salt in molten form comprises an alkali metal borate, $M_xB_{1-x}O_{1.5-x}$, wherein M is one or more alkali metals, B is Boron, O is Oxygen, and x is a number such that $0<x<1$.

3. The method of claim 2, wherein the alkali metal comprises lithium (Li), sodium (Na), potassium (K), and/or a mixture of these.

4. The method of claim 3, wherein the alkali metal comprises Li and Na in equal amounts.

5. The method of claim 2, wherein the non-$CO_2$ acid gas comprises sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_5$), and/or carbonyl sulfide (COS).

6. The method of claim 2, wherein the environment is at a temperature of at least 200° C.

7. The method of claim 2, wherein a plurality of non-$CO_2$ acid gases interacts with the sorbent such that at least a portion of the plurality of non-$CO_2$ acid gases are removed from the environment.

8. The method of claim 1, wherein the non-$CO_2$ acid gas comprises sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_3$), and/or carbonyl sulfide (COS).

9. The method of claim 1, wherein the environment is at a temperature of at least 200° C.

10. The method of claim 1, wherein a plurality of non-$CO_2$ acid gases interacts with the sorbent such that at least a portion of the plurality of non-$CO_2$ acid gases are removed from the environment.

11. The method of claim 1, wherein captured non-$CO_2$ acid gas is released in the gas phase in a separate environment.

12. The method of claim 11, wherein the release is driven, at least in part, by a change in partial pressure of the non-$CO_2$ acid gas and/or a change in temperature in the separate environment relative to the other environment.

13. The method of claim 1, wherein captured non-$CO_2$ acid gas forms a solid suspended in the molten sorbent.

14. The method of claim 13, further comprising physically separating the solid from the molten sorbent using a cross-flow filter, centrifugation, crystallization, and/or sedimentation.

15. The method of claim 14, wherein the physical separation uses a cross-flow filter, and the cross-flow filter is operated at a temperature of at least 200° C.

16. The method of claim 1, wherein the alkali metal comprises lithium (Li), sodium (Na), potassium (K), and/or a mixture of these.

17. The method of claim 16, wherein the alkali metal comprises Li and Na.

18. The method of claim 17, wherein the non-$CO_2$ acid gas comprises sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_5$), and/or carbonyl sulfide (COS).

19. The method of claim 17, wherein the environment is at a temperature of at least 200° C.

20. The method of claim 17, wherein a plurality of non-$CO_2$ acid gases interacts with the sorbent such that at least a portion of the plurality of non-$CO_2$ acid gases are removed from the environment.

21. The method of claim 16, wherein the non-$CO_2$ acid gas comprises sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_5$), and/or carbonyl sulfide (COS).

22. The method of claim 16, wherein the environment is at a temperature of at least 200° C.

23. The method of claim 16, wherein a plurality of non-$CO_2$ acid gases interacts with the sorbent such that at least a portion of the plurality of non-$CO_2$ acid gases are removed from the environment.

* * * * *

UNITED STATES PATENT AND TRADEMARK OFFICE
CERTIFICATE OF CORRECTION

PATENT NO. : 11,602,716 B2
APPLICATION NO. : 17/681413
DATED : March 14, 2023
INVENTOR(S) : Trevor Alan Hatton et al.

It is certified that error appears in the above-identified patent and that said Letters Patent is hereby corrected as shown below:

In the Claims

In Claim 8, at Column 33, Line 27:
"dinitrogen pentoxide ($N_2O_3$)"
Should read:
--dinitrogen pentoxide ($N_2O_5$)--

Signed and Sealed this
Thirtieth Day of April, 2024

Katherine Kelly Vidal
*Director of the United States Patent and Trademark Office*